United States Patent
Wang et al.

(10) Patent No.: US 12,495,818 B2
(45) Date of Patent: Dec. 16, 2025

(54) DIHYDROCHALCONES FROM BALANOPHORA HARLANDII

(71) Applicant: The Coca-Cola Company, Atlanta, GA (US)

(72) Inventors: Bin Wang, Cumming, GA (US); Gil Ma, Atlanta, GA (US); Indra Prakash, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 681 days.

(21) Appl. No.: 17/287,345

(22) PCT Filed: Oct. 22, 2019

(86) PCT No.: PCT/US2019/057410
§ 371 (c)(1),
(2) Date: Apr. 21, 2021

(87) PCT Pub. No.: WO2020/086559
PCT Pub. Date: Apr. 30, 2020

(65) Prior Publication Data
US 2021/0386098 A1 Dec. 16, 2021

Related U.S. Application Data

(60) Provisional application No. 62/749,993, filed on Oct. 24, 2018.

(51) Int. Cl.
| | | |
|---|---|---|
| A23L 2/60 | (2006.01) |
| A23L 2/56 | (2006.01) |
| A23L 2/58 | (2006.01) |
| A23L 2/68 | (2006.01) |
| A23L 27/30 | (2016.01) |
| B01D 15/32 | (2006.01) |
| B01D 15/42 | (2006.01) |
| C07H 1/08 | (2006.01) |
| C07H 15/207 | (2006.01) |

(52) U.S. Cl.
CPC ............ *A23L 2/60* (2013.01); *A23L 2/56* (2013.01); *A23L 2/58* (2013.01); *A23L 2/68* (2013.01); *A23L 27/33* (2016.08); *A23L 27/36* (2016.08); *B01D 15/325* (2013.01); *B01D 15/426* (2013.01); *C07H 1/08* (2013.01); *C07H 15/207* (2013.01)

(58) Field of Classification Search
CPC ..... A23L 2/60; A23L 2/56; A23L 2/68; C07H 1/08; C07H 15/203
See application file for complete search history.

(56) References Cited

U.S. PATENT DOCUMENTS

| | | | |
|---|---|---|---|
| 3,087,821 A | 4/1963 | Horowitz et al. | |
| 9,198,451 B2 * | 12/2015 | Riess | A23L 27/36 |
| 9,445,606 B2 * | 9/2016 | Krammer | A23C 9/1544 |
| 2008/0226799 A1 * | 9/2008 | Lee | A23L 2/56 |
| | | | 426/590 |
| 2013/0011540 A1 | 1/2013 | Hansen et al. | |
| 2014/0342043 A1 * | 11/2014 | Bell | A23L 2/60 |
| | | | 426/72 |
| 2018/0235259 A1 * | 8/2018 | Jia | A23L 27/30 |

FOREIGN PATENT DOCUMENTS

| | | |
|---|---|---|
| EP | 0908107 | 4/1999 |
| WO | WO 2018-200663 | 11/2018 |

OTHER PUBLICATIONS

Feng Jing et al: "Chemical Constituents of Balanophora involucrata", Chemistry of Natural Compounds, Consultants Bureau, New York, NY, US, vol. 54, No. 4, Jul. 23, 2018 (Jul. 23, 2018), pp. 646-648, Mar. 6, 2024.
Pan Jianyu et al: "Chemical constituents of Balanophora involucrata",Chinese Traditional and Herbal Drugs,vol. 39, No. 3, Jan. 1, 2008 (Jan. 1, 2008), pp. 327-331. (abstract).
Antus Set Al: "Dihydrochalcone-type sweetening agents. I. Structure-taste relationships", Acta Chimica Academiae Scientiarum Hungarica., vol. 98, No. 2, Jan. 1, 1978 (Jan. 1, 1978), pp. 225-230.
International Search Report for PCT/US2019/057410, issued Feb. 7, 2020.
Wang, W. et al., "A New Hydrolyzable Tannin from Balanophora harlandii with Radical-Scavenging Activity", Helvetica Chimica Acta, 2009, vol. 92, pp. 1817-1822.

\* cited by examiner

*Primary Examiner* — Nikki H. Dees
*Assistant Examiner* — Andrew E Merriam
(74) *Attorney, Agent, or Firm* — King & Spalding

(57) ABSTRACT

Methods of isolating dihydrochalcone compounds of Formula (I) from *Balanophora harlandii* are provided herein. Compositions and consumables comprising at least one sweetener and at least one dihydrochalcone compound described herein are also provided. Methods of enhancing the sweetness of a consumable, methods of making a consumable taste more like a sucrose-sweetened consumable and methods of preparing consumables are also detailed herein.

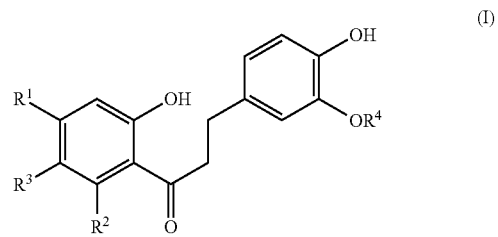

(I)

15 Claims, 1 Drawing Sheet

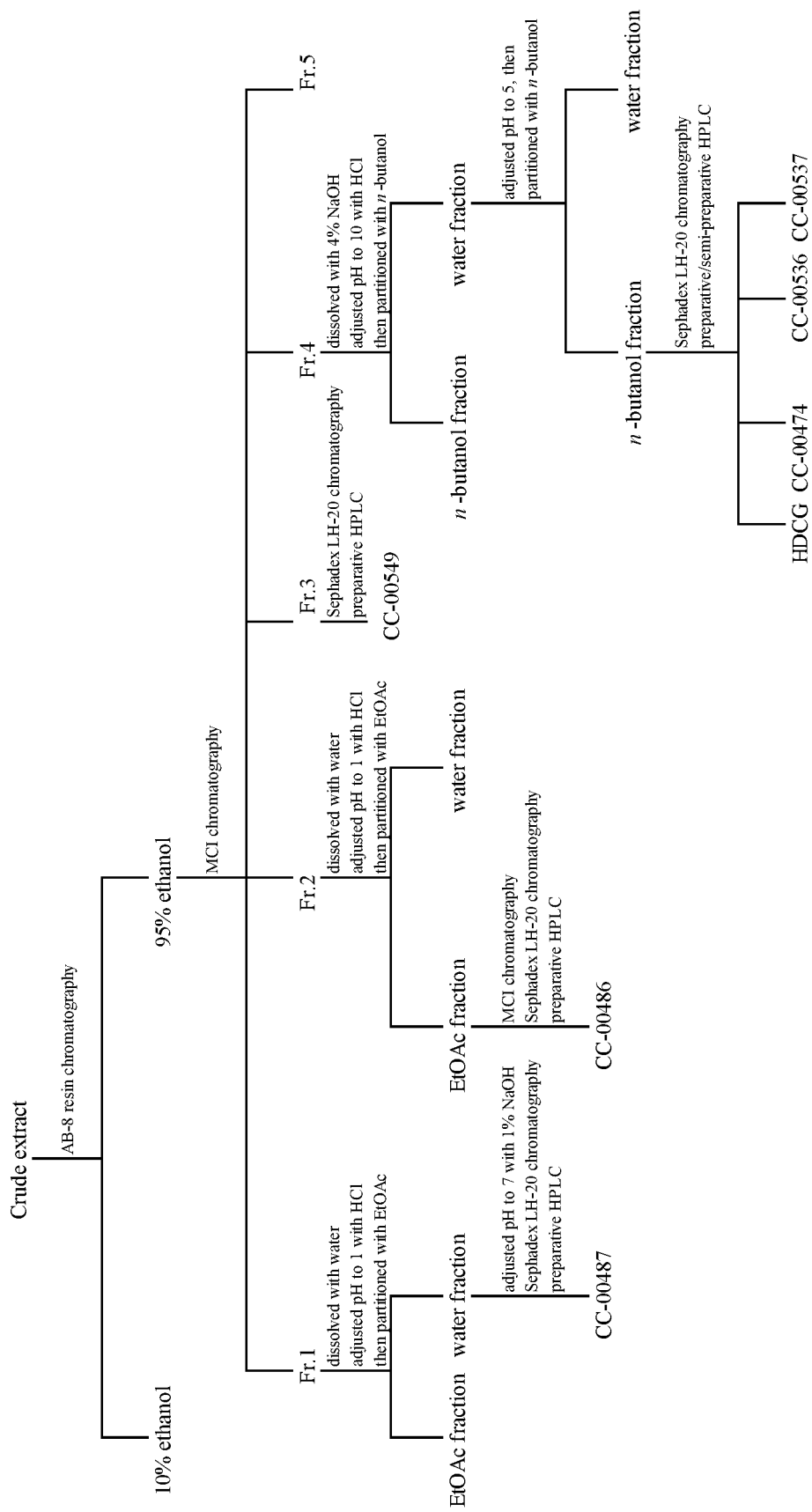

DIHYDROCHALCONES FROM BALANOPHORA HARLANDII

CROSS REFERENCE TO RELATED APPLICATIONS

This application is a national phase application under 35 U.S.C. § 371 of International Application No. PCT/US2019/057410, filed Oct. 22, 2019, which claims priority to U.S. Provisional Application No. 62/749,993, filed Oct. 24, 2018. The contents of each of the above-identified applications is hereby fully incorporated herein by reference.

FIELD OF THE INVENTION

The present teaching relates to methods of isolating dihydrochalcone compounds from *Balanophora harlandii* and uses of said dihydrochalcone compounds in consumables.

BACKGROUND OF THE INVENTION

Natural caloric sugars, such as sucrose, fructose and glucose, are used to provide a pleasant taste to beverages, foods, pharmaceuticals, and oral hygienic/cosmetic products. Sucrose, in particular, imparts a taste preferred by consumers. Although sucrose provides superior sweetness characteristics, it is disadvantageously caloric.

Non-caloric or low caloric sweeteners have been introduced to satisfy consumer demand. However, non- and low caloric sweeteners differ from natural caloric sugars in ways that frustrate consumers. On a taste basis, non-caloric or low caloric sweeteners exhibit a temporal profile, maximal response, flavor profile, mouth feel, and/or adaptation behavior that differ from sugar. Specifically, non-caloric or low caloric sweeteners exhibit delayed sweetness onset, lingering sweet aftertaste, bitter taste, metallic taste, astringent taste, cooling taste and/or licorice-like taste. On a source basis, many non-caloric or low caloric sweeteners are synthetic chemicals. Consumer desire remains high for natural non-caloric or low caloric sweeteners that tastes like sucrose.

*Stevia rebaudiana* Bertoni is a perennial shrub of the Asteraceae (Compositae) family native to certain regions of South America. Its leaves have been used for hundreds of years in Paraguay and Brazil to sweeten local teas and medicines. The plant is commercially cultivated in Japan, Singapore, Taiwan, Malaysia, South Korea, China, Israel, India, Brazil, Australia and Paraguay.

The leaves of the plant contain a mixture of diterpene glycosides in an amount ranging from about 10% to 15% of the total dry weight. These diterpene glycosides are about 30 to 450 times sweeter than sugar. Structurally, the diterpene glycosides are characterized by a single base, steviol, and differ by the presence of carbohydrate residues at positions C13 and C19. Typically, on a dry weight basis, the four major steviol glycosides found in the leaves of *Stevia* are dulcoside A (0.3%), rebaudioside C (0.6-1.0%), rebaudioside A (3.8%) and stevioside (9.1%). Other glycosides identified in *Stevia* extract include rebaudioside B, D, E, and F, steviolbioside and rubusoside. Among these, only stevioside and rebaudioside A are available on a commercial scale.

Mogrosides are derived from Luo Han Guo, the common name for the sweet extract made from the fruit of *Siraitia grosvenorii*, a herbaceous perennial vine of the Cucurbitaceae family native to Southern China and Northern Thailand. Luo Han Guo extracts are nearly 250 times sweeter than sugar and non-caloric. The sweetness of Luo Han Guo is generally attributed to mogrosides.

Use of steviol glycosides and mogrosides has been limited to date by certain undesirable taste properties, including licorice taste, bitterness, astringency, sweet aftertaste, bitter aftertaste and licorice aftertaste, which become more prominent at increased concentrations and impart a taste distinct from sucrose to consumables (e.g., beverages) to which they are added. In addition, maximal sweetness of most steviol glycoside and mogrosides is generally less than what is acceptable for traditional beverage formulations in sweetened consumables (e.g., beverages).

SUMMARY OF THE INVENTION

The present teaching relates to dihydrochalcone compounds isolated from *Balanophora harlandii* and use of the same in consumables, such as beverages.

In one aspect, a method of purifying a dihydrochalcone compound of Formula I from *Balanophora harlandii* is provided:

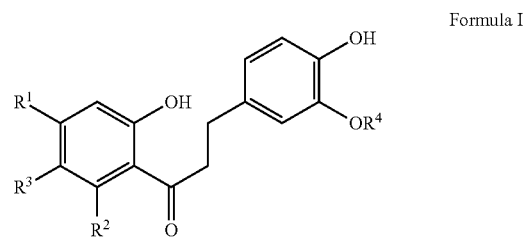

Formula I wherein $R^1$ and $R^2$ are each independently selected from OH and $OR^6$; $R^3$ is selected from hydrogen and $CH_2COOH$; $R^4$ is selected from hydrogen and $CH_3$; and $R^6$ is an optionally substituted saccharide. The method includes (a) providing a crude extract of *B. harlandii* plant material, (b) passing the crude extract over a column packed with polymeric adsorbent resin and eluting with an aqueous ethanol solvent containing at least about 75% ethanol to provide a first solution containing at least one dihydrochalcone of Formula I; and (c) purifying the first solution containing at least one dihydrochalcone of Formula I with reverse phase chromatography to provide a second solution containing at least one dihydrochalcone of Formula I.

In one aspect, the second solution can then be subjected to further treatment(s) to provide individual dihydrochalcones of Formula Ia selected from CC-00487, CC-00486 and CC-00474 in purities of at least about 80% by weight on a dry basis.

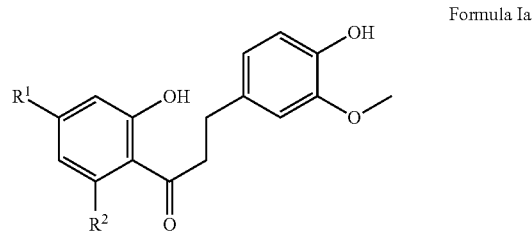

Formula Ia

CC-00474: $R^1 = O\text{-}\beta\text{-D-Glc}$, $R^2 = OH$
CC-00486: $R^1 = OH$, $R^2 = O\text{-}\beta\text{-D-Glc}$
CC-00487: $R^1 = R^2 = O\text{-}\beta\text{-D-Glc}$ In another aspect, the second solution can then be subjected to further treatment(s) to provide individual dihydrochalcones of Formula Ib selected from CC-00549, CC-00536 and CC-00537 in purities of at least about 80% by weight on a dry basis:

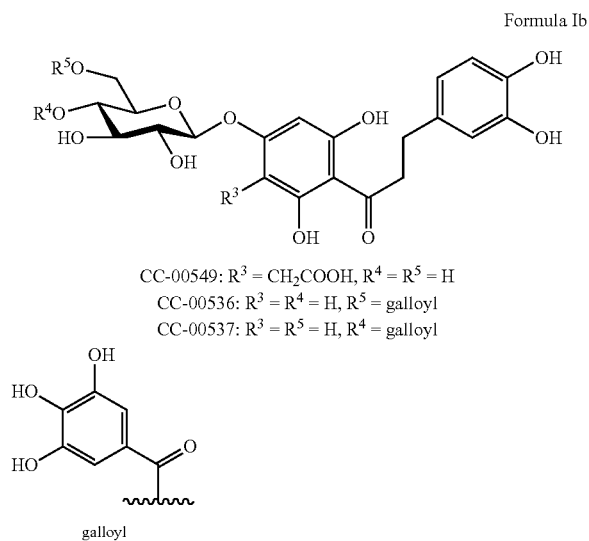

Formula Ib

CC-00549: $R^3$ = $CH_2COOH$, $R^4$ = $R^5$ = H
CC-00536: $R^3$ = $R^4$ = H, $R^5$ = galloyl
CC-00537: $R^3$ = $R^5$ = H, $R^4$ = galloyl galloyl In another aspect, compositions are provided comprising at least one sweetener and at least one dihydrochalcone described herein (i.e. dihydrochalcone compounds of Formula I, Formula Ia and Formula Ib). The at least one sweetener can be any known sweetener and is present in a sweetening amount. In one embodiment, the sweetener is selected from at least one steviol glycoside, at least one mogroside or a combination thereof.

In a particular embodiment, the at least one dihydrochalcone compound described herein is present in an amount at or below its sweetness recognition threshold concentration.

In one embodiment, the at least one dihydrochalcone compound described herein is present in the composition in an amount such that, when the composition is added to a consumable, the sucrose equivalence (SE) of the consumable is enhanced by at least about 1.2-fold (times) compared to the SE of the consumable in the absence of the at least one dihydrochalcone compound.

In another embodiment, the at least one dihydrochalcone compound described herein is present in the composition in an amount such that, when the composition is added to a consumable, one or more taste attributes of the sweetener is modulated making the consumable taste more like a sucrose-sweetened consumable compared to the consumable in the absence of the at least one dihydrochalcone compound.

Consumables are provided comprising at least one sweetener and at least one dihydrochalcone compound described herein, wherein the sweetener is present in a sweetening amount.

In one embodiment, the at least one dihydrochalcone compound described herein is present in the consumable in an amount effective to enhance the sucrose equivalence (SE) of the consumable by at least about 1.2-fold compared to the SE of the consumable in the absence of the at least one dihydrochalcone compound.

In another embodiment, the at least one dihydrochalcone compound described herein is present in the consumable in an amount effective to modulate one or more taste attributes of the sweetener making the consumable taste more like a sucrose-sweetened consumable compared to the consumable in the absence of the at least one dihydrochalcone compound.

In one embodiment, the at least one dihydrochalcone compound described herein is present in the consumable in a concentration from about 1 ppm to about 50 ppm.

In one embodiment, the at least one sweetener is present in the consumable in a concentration from about 50 ppm to about 600 ppm.

Exemplary consumables include, but are not limited to, pharmaceutical compositions, edible gels and mixes, dental compositions, confections, condiments, chewing gum, cereal compositions, baked goods, dairy products, tabletop sweeteners, beverages and beverage products.

In particular embodiments, the consumable is a beverage or beverage product. In embodiments where the consumable is a beverage, the beverage can be a full-calorie, mid-calorie, low-calorie or zero-calorie beverage.

In another aspect, a method of enhancing the sweetness of a consumable is provided, comprising (i) providing a consumable comprising at least one sweetener and (ii) adding at least one dihydrochalcone compound described herein to the consumable, providing a consumable with enhanced sweetness. The SE of the consumable comprising the at least one dihydrochalcone can be enhanced by at least about 1.2-fold compared to the SE of the consumable in the absence of the at least one dihydrochalcone compound.

In another embodiment, a method of enhancing the sweetness of a consumable is provided, comprising (i) providing a consumable matrix and (ii) adding at least one sweetener and at least one dihydrochalcone compound described herein to the consumable matrix to provide a consumable with enhanced sweetness. The at least one dihydrochalcone compound is added to the consumable matrix in an amount effective to enhance the SE of the consumable by at least about 1.2-fold compared to the SE of the consumable in the absence of the at least one dihydrochalcone compound.

Methods of making a consumable taste more like a sucrose-sweetened consumable are also provided, comprising (i) providing a consumable comprising at least one sweetener and (ii) adding at least one dihydrochalcone compound described herein to the consumable in an amount effective to modulate one or more taste attributes of the sweetener to make the consumable taste more like a sucrose-sweetened consumable when compared to the consumable in the absence of the at least one dihydrochalcone compound.

In another embodiment, a method of making a consumable taste more like a sucrose-sweetened consumable is provided, comprising (i) providing a consumable matrix and (ii) adding at least one sweetener and at least one dihydrochalcone compound described herein to the consumable matrix. The at least one dihydrochalcone compound is added to the consumable matrix in an amount effective to modulate one or more taste attributes of the sweetener to make the consumable taste more like a sucrose-sweetened consumable when compared to a consumable in the absence of the at least one dihydrochalcone compound.

BRIEF DESCRIPTION OF THE DRAWINGS

FIG. 1 shows the isolation scheme for CC-00487, CC-00486 and CC-00474, CC-00536, CC-00537 and CC-00549 from *Balanophora harlandii*.

DETAILED DESCRIPTION OF THE INVENTION

I. Definitions

The term "consumables," as used herein, means substances which are contacted with the mouth of man or animal, including substances which are taken into and subsequently ejected from the mouth and substances which are drunk, eaten, swallowed or otherwise ingested, and are safe for human or animal consumption when used in a generally acceptable range.

The term "sweetness enhancer", as used herein, refers to a compound that enhances, amplifies or potentiates the perception of sweetness of a consumable (e.g. a beverage) when the compound is present in the consumable in a concentration at or below the compound's sweetener recognition threshold, i.e. a concentration at which the compound does not contribute any noticeable sweet taste in the absence of additional sweetener(s). The term "sweetness enhancer" is synonymous with the terms "sweet taste potentiator," "sweetness potentiator," "sweetness amplifier," and "sweetness intensifier."

The term "sweetness recognition threshold concentration," as generally used herein, is the lowest known concentration of a compound that is perceivable by the human sense of taste as sweet. The sweetness recognition threshold concentration is specific for a particular compound, and can vary based on temperature, matrix, ingredients and/or flavor system.

The term "taste modulator", as used herein, refers to a compound that positively impacts the perception of a non-sucrose sweetener in a consumable (e.g. a beverage) in such a way that the consumable tastes more like a sucrose-sweetened beverage. For example, certain negative taste properties of non-sucrose sweeteners can be masked with taste modulators, e.g. bitterness, sourness, astringency, saltiness and metallic notes. In another example, mouthfeel can be improved. In still another example, sweetness linger can be decreased. In yet another example, sweetness onset can be increased. In a further example, sweetness onset can be improved. In a still further example, the bitterness linger can be improved.

II. Methods of Isolation from *B. harlandii*

A method for purifying dihydrochalcone compounds of Formula I from *B. harlandii* is provided, including:
(a) providing a crude extract of *B. harlandii* plant material;
(b) passing the crude extract over a column packed with polymeric adsorbent resin and eluting with aqueous ethanol containing at least about 75% ethanol to provide a solution containing at least one dihydrochalcone compound of Formula I; and
(c) purifying the solution containing at least one dihydrochalcone compound with reverse phase chromatography to provide a purified dihydrochalcone compound of Formula I.

*B. harlandii* is a type of parasitic plant from *Balanophora*, typically found across temperate and tropical Asia, Africa and Pacific regions. All *Balanophora* species act as parasites on the roots of the host plant. *Balanophora* has an underground tuber, inconspicuous flowering system, colored scale leaves and tiny flowers.

All or part of the *B. harlandii* plant can be used in the present methods. In one embodiment, *B. harlandii* plant material is partially dried prior to extraction. In another embodiment, *B. harlandii* plant materially is totally dried prior to extraction. In some embodiments, the plant material is optionally milled prior to extraction.

The plant material may be extracted by any suitable extraction process, such as, for example, continuous or batch reflux extraction, supercritical fluid extraction, enzyme-assisted extraction, microorganism-assisted extraction, ultrasound-assisted extraction, microwave-assisted extraction, etc. The methods may be deployed at any scale.

The solvent used for the extraction can be any suitable solvent, such as for example, polar organic solvents (degassed, vacuumed, pressurized or distilled), non-polar organic solvents, water (degassed, vacuumed, pressurized, deionized, distilled, carbon-treated or reverse osmosis) or a mixture thereof. In a particular embodiment, the solvent comprises water and one or more alcohols. In a particular embodiment, the solvent comprises water and an alcohol selected from methanol, ethanol, n-propanol, 2-propanol, 1 butanol, 2-butanol and mixtures thereof. In a more particular embodiment, the solvent contains water and ethanol.

The amount of alcohol in the solvent can vary from about 10% to about 100%, such as, for example, about 20%, about 30%, about 40%, about 50%, about 60%, about 70%, about 80%, about 90% or any range between. In a particular embodiment, alcohol comprises from about 70% to about 90% of the solvent, with the remainder being water.

In some embodiments, the extraction process takes place at elevated temperatures, such as, for example, from about 50° C. to about 100° C. In a more particular embodiment, the extraction process takes place at a temperature from about 60° C. to about 80° C., or about 70° C.

Those skilled in the art will understand that the duration of the extraction will vary based on the amount of solvent and plant material used. In some embodiments, the extraction is carried out for from about 1 hour to about 24 hours, such as, for example, at least about 4 hours, at least about 8 hours, at least about 12 hours, at least about 16 hours or at least about 20 hours.

Water and/or any insoluble material can be removed from the extraction mixture to provide a "crude extract."

Insoluble plant material may be separated from the extracted mixture by, e.g., filtration. Other suitable separation methods include, but are not limited to, gravity filtration, a plate-and-frame filter press, cross flow filters, screen filters, Nutsche filters, belt filters, ceramic filters, membrane filters, microfilters, nanofilters, ultrafilters or centrifugation. Optionally, various filtration aids such as diatomaceous earth, bentonite, zeolite etc., may be used in this process.

The crude extract is then subjected to one or more chromatographic separations to provide a solution of at least one dihydrochalcone compound described herein.

The crude extract is passed over one or more columns, e.g. those packed with polymeric adsorbent resins. Elution of the one or more columns with aqueous ethanol provides a solution containing at least one dihydrochalcone compound described herein. In one embodiment, 10% ethanol is first applied to the column and the eluent collected. Typically, this first eluent fraction does not contain at least one dihydrochalcone described herein. Eluting with solvent containing at least about 75% ethanol, such as, for example, about 85% ethanol or about 95% ethanol, provides a solution containing at least one dihydrochalcone compound described herein.

The solution containing at least one dihydrochalcone compound described herein is then subjected to reverse phase chromatography for further purification. The column can be packed with any material suitable for reverse phase chromatography, e.g. a MCI gel column. Fractions are collected and further processed using LC-MS as a guide, through Extracted Ion Chromatogram (EIC or XIC) with quasi-ion or fragments of hesperetin dihydrochalcone monoglycoside or its analogues (e.g. [M-H]⁻ at m/z 465). A gradient of methanol and water is used for elution. In one embodiment, a gradient of 1:4→4:1 (methanol:water) is used. The gradient can be continuous or step-wise.

Fractions can be collected based on % methanol used for elution, e.g., 20% methanol, 40% methanol, 50% methanol, 60% methanol and 80% methanol.

Extraction of the fractions, adjustment of pH, partitioning and chromatography permit isolation of individual purified dihydrochalcone compounds described herein. FIG. 1 illustrates an exemplary isolation scheme.

As would be understood by a person of skill in the art, the mass of the desired dihydrochalcone compound can be followed by MS or HPLC-MS throughout the methods used herein, e.g. to guide fractionation and purification steps.

CC-00487 can be isolated by diluting a solution of at least one dihydrochalcone compound of Formula I (e.g. obtained during 20% methanol/80% water elution in the reverse phase chromatography step above and tracking with EIC) with water, acidification, partitioning, basifying and concentration. Acidification can be carried out with any suitable acid, e.g. a strong acid such as HCl, to a pH from about 1 to about 3, such as, for example, a pH of around 1. Partitioning can be performed with any suitable organic solvent, e.g. ethyl acetate. Basifying the aqueous portion can be carried out with any suitable base, e.g. a strong base such as NaOH, to a pH from about 6 to about 8, such as, for example, about 7. The concentrate can then be purified, e.g. by HPLC or another suitable method, to provide CC-00487.

CC-00486 can be isolated by diluting a solution of at least one dihydrochalcone of Formula I (e.g. obtained during 40% methanol/60% water elution in the reverse phase chromatography step above and tracking with EIC) with water, acidification, partitioning and concentration. Acidification can be carried out with any suitable acid, e.g. a strong acid such as HCl, to a pH from about 1 to about 3, such as, for example, a pH of around 1. Partitioning can be carried out with any suitable organic solvent, e.g. ethyl acetate. The organic portion can then be concentrated. The concentrate can then be purified, e.g. by HPLC or another suitable method, to provide CC-00486.

CC-00474 can be isolated by diluting a solution of at least one dihydrochalcone of Formula I (e.g. obtained during 60% methanol/40% water in the reverse phase chromatography step above and tracking with EIC) with aqueous base, acidification, partitioning, further acidification, further partitioning, concentration and separation. Dilution with aqueous base can be with, for example aqueous NaOH. Acidification can be carried out with any suitable acid, e.g. a strong acid such as HCl, to a pH from about 8 to about 11, such as, for example, a pH of around 10. Partitioning can be performed with any suitable organic solvent, e.g. n-butanol. The aqueous portion of the partitioning can be further acidified with any suitable acid, e.g. a strong acid such as HCl, to a pH from about 4 to about 6, such as, for example, about 5. The resulting acidified aqueous solution can be further partitioned with any suitable organic solvent, e.g. n-butanol. The n-butanol portion can then be concentrated. The concentrate can be purifying the concentrate, e.g. by HPLC, to provide CC-00474.

CC-00549 can be isolated by subjecting the material obtained from the reverse phase chromatography step above, e.g. during 50% methanol/50% water in the reverse phase chromatography step above and tracking with EIC, to further column chromatography (e.g. HPLC) to provide CC-00549.

hesperetin dihydrochalcone-4'-β-D-glucoside (HDCG) can be isolated by diluting a solution of at least one dihydrochalcone of Formula I (e.g. obtained during 60% methanol/40% water in the reverse phase chromatography step above and tracking with EIC) with aqueous base, acidification, partitioning, further acidification, further partitioning, concentration and separation. Dilution with aqueous base can be with, for example aqueous NaOH. Acidification can be carried out with any suitable acid, e.g. a strong acid such as HCl, to a pH from about 8 to about 11, such as, for example, a pH of around 10. Partitioning can be performed with any suitable organic solvent, e.g. n-butanol. The aqueous portion of the partitioning can be further acidified with any suitable acid, e.g. a strong acid such as HCl, to a pH from about 4 to about 6, such as, for example, about 5. The resulting acidified aqueous solution can be further partitioned with any suitable organic solvent, e.g. n-butanol. The n-butanol portion can then be concentrated. The concentrate can be purified to provide HDCG by, e.g. HPLC chromatography.

CC-00536 can be isolated by diluting a solution of at least one dihydrochalcone compound of Formula I (e.g. obtained during 60% methanol/40% water in the reverse phase chromatography step above and tracking with EIC) with aqueous base, acidification, partitioning, further acidification, further partitioning, concentration and separation. Dilution with aqueous base can be with, for example aqueous NaOH. Acidification can be carried out with any suitable acid, e.g. a strong acid such as HCl, to a pH from about 8 to about 11, such as, for example, a pH of around 10. Partitioning can be performed with any suitable organic solvent, e.g. n-butanol. The aqueous portion of the partitioning can be further acidified with any suitable acid, e.g. a strong acid such as HCl, to a pH from about 4 to about 6, such as, for example, about 5. The resulting acidified aqueous solution can be further partitioned with any suitable organic solvent, e.g. n-butanol. The n-butanol portion can then be concentrated. The concentrate can be purified to provide CC-00536 by, e.g. HPLC chromatography.

CC-00537 can be isolated by diluting a solution of at least one dihydrochalcone compound of Formula I (e.g. obtained during 60% methanol/40% water in the reverse phase chromatography step above and tracking with EIC) with aqueous base, acidification, partitioning, further acidification, further partitioning, concentration and separation. Dilution with aqueous base can be with, for example aqueous NaOH. Acidification can be carried out with any suitable acid, e.g. a strong acid such as HCl, to a pH from about 8 to about 11, such as, for example, a pH of around 10. Partitioning can be performed with any suitable organic solvent, e.g. n-butanol. The aqueous portion of the partitioning can be further acidified with any suitable acid, e.g. a strong acid such as HCl, to a pH from about 4 to about 6, such as, for example, about 5. The resulting acidified aqueous solution can be further partitioned with any suitable organic solvent, e.g. n-butanol. The n-butanol portion can then be concentrated. The concentrate can be purified to provide CC-00537 by, e.g. HPLC chromatography.

The methods described herein provide a dihydrochalcone compound described herein in a purity of at least about 80% by weight on a dry basis, such as, for example, at least about 85%, at least about 90%, at least about 95%, at least about 97% or at least about 99%. Those of skill in the art will understand that additional purification steps, e.g. chromatographic separations on various types of columns, can be conducted to arrive at the above-referenced purities.

II. Enhancers/Taste Modulators

In one embodiment, dihydrochalcone compounds of the Formula I are sweetness enhancers. In another embodiment, dihydrochalcone compounds of Formula I are taste modulators, with or without simultaneously acting as sweetness enhancers. That is, in some embodiments, the dihydrochalcone compound enhances sweetness and modulates one or more taste attributes of the sweetener. In other embodiments, the dihydrochalcone compound enhances the sweetness of the sweetener without modulating one or more taste attributes of the sweetener. In still other embodiments, the dihydrochalcone compound modulates one or more taste attributes of the sweetener without enhancing the sweetness of the sweetener.

In one embodiment, dihydrochalcone compounds of Formula I are useful as sweetness enhancers and/or taste modulators:

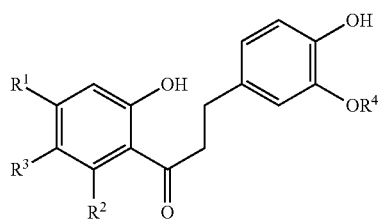

Formula I wherein $R^1$ and $R^2$ are each independently selected from OH and $OR^6$; $R^3$ is selected from hydrogen and $CH_2COOH$; $R^4$ is selected from hydrogen and $CH_3$; and $R^6$ is an optionally substituted saccharide.

"Saccharide", as used herein, refers to monosaccharides, disaccharides, oligosaccharides and polysaccharides. A saccharide comprises at least one carbohydrate. Exemplary carbohydrates include, but are not limited to, sucrose, glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, fucose, rhamnose, arabinose, turanose and sialose.

The saccharides can be either D- or L. In one embodiment, the saccharide is D-glucose.

Furthermore, the saccharides can be in the α- or β-configuration. In one embodiment, the saccharide is β-D-glucose.

In some embodiments, the saccharide is substituted. "Substituted" as used herein with respect to saccharides, refers to substitution on one or more oxygens in the hydroxyl (—OH) positions. Exemplary substituent groups include, but are not limited to, galloyl, vanillyl, feruloyl, any other mono-, di-, tri-, hydroxybenzoyl and methoxybenzoyl.

In one particular embodiment, the dihydrochalcone compound is a compound of Formula Ia:

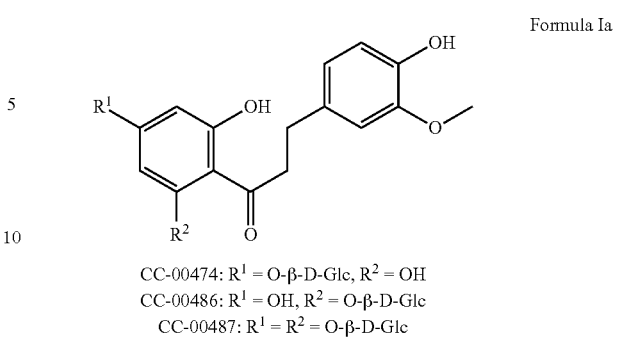

Formula Ia

CC-00474: $R^1 = O\text{-}\beta\text{-D-Glc}$, $R^2 = OH$
CC-00486: $R^1 = OH$, $R^2 = O\text{-}\beta\text{-D-Glc}$
CC-00487: $R^1 = R^2 = O\text{-}\beta\text{-D-Glc}$ In another embodiment, the dihydrochalcone compound is a compound of Formula Ib:

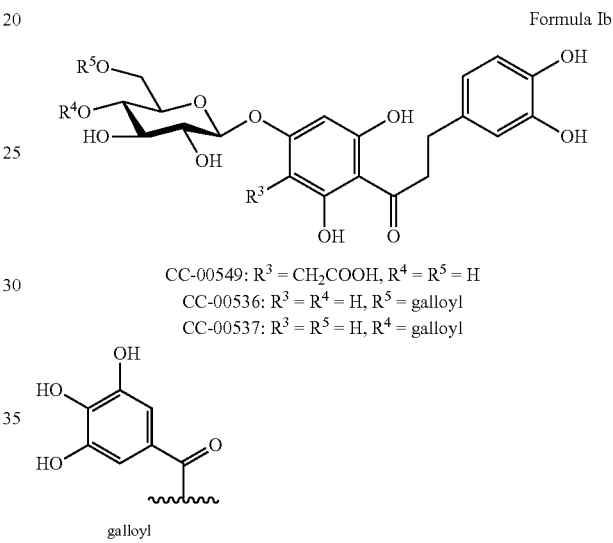

Formula Ib

CC-00549: $R^3 = CH_2COOH$, $R^4 = R^5 = H$
CC-00536: $R^3 = R^4 = H$, $R^5 = $ galloyl
CC-00537: $R^3 = R^5 = H$, $R^4 = $ galloyl

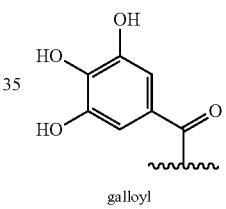

galloyl

The dihydrochalcone compounds described herein can be provided in pure form or as part of mixture. The mixture can be an extract prepared from the plant or portion of a plant, as described hereinabove, or commercially available.

In one embodiment, the dihydrochalcone compound described herein comprises at least about 50% by weight of a mixture, such as, for example, at least about 60%, at least about 70%, at least about 80%, at least about 90% or at least about 95%. In a more particular embodiment, the dihydrochalcone compound described herein comprises at least about 96%, at least about 97%, at least about 98% or at least about 99% by weight of a mixture.

Mixtures of at least two dihydrochalcone compounds described herein are also contemplated, such as, for example, at least three dihydrochalcone compounds. The at least two dihydrochalcone compounds described herein can each independently be provided either in pure form or as part of a mixture. In one embodiment, the at least two dihydrochalcone compounds described herein comprise at least about 50% by weight of a mixture, such as, for example, at least about 60%, at least about 70%, at least about 80%, at least about 90% or at least about 95%. In a more particular embodiment, the at least two dihydrochalcone compounds described herein comprise at least about 96%, at least about 97%, at least about 98% or at least about 99% by weight of a mixture.

III. Sweetener

The dihydrochalcone compounds of Formula I enhance and/or modulate the taste of at least one sweetener. The at least one sweetener can be any known sweetener, e.g. a natural sweetener, a natural high potency sweetener, a synthetic sweetener.

The at least one sweetener is present in a sweetening amount. "Sweetening amount", as used herein, refers to the amount of compound required to provide detectable sweetness when present in a consumable, e.g. a beverage.

As used herein, the phrase "natural high potency sweetener" refers to any sweetener found naturally in nature and characteristically has a sweetness potency greater than sucrose, fructose, or glucose, yet has less calories. The natural high potency sweetener can be provided as a pure compound or, alternatively, as part of an extract. As used herein, the phrase "synthetic sweetener" refers to any composition which is not found naturally in nature and characteristically has a sweetness potency greater than sucrose, fructose, or glucose, yet has less calories.

In other embodiments, the at least one sweetener is a carbohydrate sweetener. Suitable carbohydrate sweeteners are selected from, but not limited to, the group consisting of sucrose, glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, fucose, rhamnose, arabinose, turanose, sialose and combinations thereof.

In other embodiments, the at least one sweetener does not comprise a carbohydrate sweetener.

In another embodiment, the additional sweetener is a rare sugar selected from sorbose, lyxose, ribulose, xylose, xylulose, D-allose, L-ribose, D-tagatose, L-glucose, L-fucose, L-arabinose, turanose and combinations thereof.

Other sweeteners include siamenoside I, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, steviolbioside and cyclocarioside I, sugar alcohols such as erythritol, sucralose, potassium acesulfame, acesulfame acid and salts thereof, aspartame, alitame, saccharin and salts thereof, neohesperidin dihydrochalcone, cyclamate, cyclamic acid and salts thereof, neotame, advantame, glucosylated steviol glycosides (GSGs) and combinations thereof.

In one embodiment, the sweetener is a caloric sweetener or mixture of caloric sweeteners. In another embodiment, the caloric sweetener is selected from sucrose, fructose, glucose, high fructose corn/starch syrup, a beet sugar, a cane sugar and combinations thereof.

In other embodiments, the sweetener comprises at least one steviol glycoside, wherein the at least one steviol glycoside is present in a sweetening amount. The steviol glycoside can be natural, synthetic or a combination of natural and synthetic.

The steviol glycoside can be provided in pure form or as part of a mixture, i.e. a steviol glycoside blend. Exemplary steviol glycosides include, but are not limited to, rebaudioside M, rebaudioside D, rebaudioside A, rebaudioside N, rebaudioside 0, rebaudioside E, steviolmonoside, steviolbioside, rubusoside, dulcoside B, dulcoside A, rebaudioside B, rebaudioside G, stevioside, rebaudioside C, rebaudioside F, rebaudioside I, rebaudioside H, rebaudioside L, rebaudioside K, rebaudioside J, rebaudioside M2, rebaudioside D2, rebaudioside S, rebaudioside T, rebaudioside U, rebaudioside V, rebaudioside W, rebaudioside Z1, rebaudioside Z2, rebaudioside IX, enzymatically glucosylated steviol glycosides and combinations thereof.

In certain embodiments, a steviol glycoside blend comprises at least about 5% steviol glycoside by weight, such as, for example, at least about 10%, at least about 20%, at least about 30%, at least about 40%, at least about 50%, at least about 60%, at least about 70%, at least about 80%, at least about 90%, at least about 95% or at least about 97%.

In exemplary embodiments, the steviol glycoside blend comprises at least about 50% steviol glycoside by weight, such as, for example, from about 50% to about 90%, from about 50% to about 80%, from about 50% to about 70%, from about 50% to about 60%, from about 60% to about 90%, from about 60% to about 80%, from about 60% to about 70%, from about 70% to about 90%, from about 70% to about 80% and from about 80% to about 90%.

In one embodiment, the sweetener is a steviol glycoside blend comprising rebaudioside M in a sweetening amount. In one embodiment, the steviol glycoside blend comprises at least about 5% rebaudioside M by weight, such as, for example, at least about 10%, at least about 20%, at least about 30%, at least about 40%, at least about 50%, at least about 60%, at least about 70%, at least about 80%, at least about 90%, at least about 95% or at least about 97%.

In another embodiment, the sweetener is a steviol glycoside blend comprising rebaudioside A in a sweetening amount. In one embodiment, the steviol glycoside blend comprises at least about 5% rebaudioside A by weight, such as, for example, at least about 10%, at least about 20%, at least about 30%, at least about 40%, at least about 50%, at least about 60%, at least about 70%, at least about 80%, at least about 90%, at least about 95% or at least about 97%.

In still another embodiment, the sweetener is a steviol glycoside blend comprising rebaudioside D in a sweetening amount. In one embodiment, the steviol glycoside blend comprises at least about 5% rebaudioside D by weight, such as, for example, at least about 10%, at least about 20%, at least about 30%, at least about 40%, at least about 50%, at least about 60%, at least about 70%, at least about 80%, at least about 90%, at least about 95% or at least about 97%.

In yet another embodiment, the sweetener is a steviol glycoside blend comprising rebaudioside N in a sweetening amount. In one embodiment, the steviol glycoside blend comprises at least about 5% rebaudioside N by weight, such as, for example, at least about 10%, at least about 20%, at least about 30%, at least about 40%, at least about 50%, at least about 60%, at least about 70%, at least about 80%, at least about 90%, at least about 95% or at least about 97%.

In a further embodiment, the sweetener is a steviol glycoside blend comprising rebaudioside O in a sweetening amount. In one embodiment, the steviol glycoside blend comprises at least about 5% rebaudioside 0 by weight, such as, for example, at least about 10%, at least about 20%, at least about 30%, at least about 40%, at least about 50%, at least about 60%, at least about 70%, at least about 80%, at least about 90%, at least about 95% or at least about 97%.

In another embodiment, the sweetener is a steviol glycoside blend comprising rebaudioside J in a sweetening amount. In one embodiment, the steviol glycoside blend comprises at least about 5% rebaudioside J by weight, such as, for example, at least about 10%, at least about 20%, at least about 30%, at least about 40%, at least about 50%, at least about 60%, at least about 70%, at least about 80%, at least about 90%, at least about 95% or at least about 97%.

The steviol glycoside blend sweetener typically has a total steviol glycoside content of about 95% by weight or greater on a dry basis. The remaining 5% comprises other non-steviol glycoside compounds, e.g. by-products from extraction or purification processes. In some embodiments, the steviol glycoside blend sweetener has a total steviol glycoside content of about 96% or greater, about 97% or greater, about 98% or greater or about 99% or greater. "Total steviol glycoside content", as used herein, refers to the sum of the relative weight contributions of each steviol glycoside in a sample.

In one embodiment, the sweetener comprises at least one mogroside, wherein the at least one mogroside is present in a sweetening amount. The mogroside can be natural, synthetic or a combination of natural and synthetic.

The mogroside can be provided in pure form or as part of mixture, i.e. a mogroside blend. Exemplary mogrosides include, but are not limited to, any of grosmogroside I, mogroside IA, mogroside IE, 11-oxomogroside IA, mogroside II, mogroside II A, mogroside II B, mogroside II E, 7-oxomogroside II E, mogroside III, Mogroside IIIe, 11-oxomogroside IIIE, 11-deoxymogroside III, mogroside IV, Mogroside IVA 11-oxomogroside IV, 11-oxomogroside IVA, mogroside V, isomogroside V, 11-deoxymogroside V, 7-oxomogroside V, 11-oxomogroside V, isomogroside V, mogroside VI, mogrol, 11-oxomogrol, siamenoside I, an isomer of siamenoside I (e.g. those disclosed in 20170119032; incorporated by reference in its entirety), in particular the 1,6-α isomer of siamenoside I (Examples 7 and 10) and combinations thereof.

Additional exemplary mogrosides include those described in U.S. Patent Application Publication 2016039864, the contents of which are incorporated by reference herein. In a particular embodiment, the mogroside is selected from (3β, 9β,10α,11α,24R)-3-[(4-O-β-D-glucospyranosyl-6-O-β-D-glucopyranosyl]-25-hydroxyl-9-methyl-19-norlanost-5-en-24-yl-[2-O-β-D-glucopyranosyl-6—O-β-D-glucopyranosyl]-β-D-glucopyranoside); (3β, 9β, 10α, 11α, 24R)-[(2-O-β-D-glucopyranosyl-6-O-β-D-glucopyranosyl-β-D-glucopyranosyl)oxy]-25-hydroxy-9-methyl-19-nor-lanost-5-en-24-yl-[2-O-β-D-glucopyranosyl-6-O-β-D-glucopyranosyl]-β-D-glucopyranoside); (3β, 9β, 10α, 11α, 24R)-[(2-O-β-D-glucopyranosyl-6-O-β-D-glucopyranosyl-β-D-glucopyranosyl)oxy]-25-hydroxy-9-methyl-19-nor-lanost-5-en-24-yl-[2-O-β-D-glucopyranosyl-6-O-β-D-glucopyranosyl]-β-D-glucopyranoside) and combinations thereof.

The mogroside blend comprises at least one mogroside in a sweetening amount.

In certain embodiments, a mogroside blend comprises at least about 5% of the mogroside by weight, such as, for example, at least about 10%, at least about 20%, at least about 30%, at least about 40%, at least about 50%, at least about 60%, at least about 70%, at least about 80%, at least about 90%, at least about 95% or at least about 97%.

In other embodiments, the mogroside blend has a total mogroside content of about 95% by weight or greater on a dry basis. In some embodiments, the mogroside blend has a total mogroside content of about 96% or greater, about 97% or greater, about 98% or greater or about 99% or greater. "Total mogroside content", as used herein, refers to the sum of the relative weight contributions of each mogroside in a sample.

In one embodiment, the sweetener is a mogroside blend comprising siamenoside I in a sweetening amount. In one embodiment, the mogroside blend comprises at least about 5% siamenoside I by weight, such as, for example, at least about 10%, at least about 20%, at least about 30%, at least about 40%, at least about 50%, at least about 60%, at least about 70%, at least about 80%, at least about 90%, at least about 95% or at least about 97%.

In another embodiment, the sweetener is a mogroside blend comprising the 1,6-α isomer of siamenoside I in a sweetening amount. In one embodiment, the mogroside blend comprises at least about 5% of the 1,6-α isomer of siamenoside I by weight, such as, for example, at least about 10%, at least about 20%, at least about 30%, at least about 40%, at least about 50%, at least about 60%, at least about 70%, at least about 80%, at least about 90%, at least about 95% or at least about 97%.

In still another embodiment, the sweetener is a mogroside blend comprising mogroside V in a sweetening amount. In one embodiment, the mogroside blend comprises at least about 5% mogroside V by weight, such as, for example, at least about 10%, at least about 20%, at least about 30%, at least about 40%, at least about 50%, at least about 60%, at least about 70%, at least about 80%, at least about 90%, at least about 95% or at least about 97%.

The weight ratio of the at least one sweetener to the at least one dihydrochalcone compound described herein can vary. Typically, the weight ratio of the at least one sweetener to the at least one dihydrochalcone is from about 500:1 to about 2:1, such as, for example, from about 100:1 to about 2:1, from about 50:1 to about 2:1, from about 25:1 to about 2:1, from about 10:1 to about 2:1, from about 5:1 to about 2:1, from about 500:1 to about 400:1, from about 500:1 to about 300:1, from about 500:1 to about 200:1, from about 500:1 to about 100:1, from about 500:1 to about 50:1, from about 500:1 to about 25:1, from about 500:1 to about 10:1, from about 400:1 to about 300:1, from about 400:1 to about 200:1, from about 400:1 to about 100:1, from about 400:1 to about 50:1, from about 400:1 to about 25:1, from about 400:1 to about 10:1, from about 400:1 to about 6.67:1, from about 300:1 to about 200:1, from about 300:1 to about 100:1, from about 300:1 to about 50:1, from about 300:1 to about 25:1, from about 300:1 to about 10:1, from about 300:1 to about 6.67:2, from about 200:1 to about 100:1, from about 200:1 to about 50:1, from about 200:1 to about 25:1, from about 200:1 to about 10:1, from about 100:1 to about 50:1, from about 100:1 to about 25:1, from about 100:1 to about 10:1, from about 100:1 to about 6.67:1, from about 50:1 to about 25:1, from about 50:1 to about 25:1, from about 50:1 to about 10:1, from about 50:1 to about 6.65:1, from about 25:1 to about 10:1, from about 25:1 to about 6.67:1, from about 10:1 to about 6.67:1 and any range in between.

IV. Compositions

The present invention also provides compositions comprising at least one sweetener described herein and at least one dihydrochalcone compound of Formula I.

The at least one dihydrochalcone compound described herein is present in the composition in an amount such that, when the composition is added to a consumable, the sucrose equivalence of the consumable is increased compared to the consumable in the absence of the dihydrochalcone compound.

The at least one dihydrochalcone compound described herein can be present in the composition in an amount such that, when the composition is added to a consumable, the sucrose equivalence (SE) of the consumable is enhanced by at least about 1.2-fold compared to the SE of the consumable in the absence of the at least one dihydrochalcone, such as, for example, at least about 1.5-fold, at least about 1.7-fold, at least about 2.0-fold, at least about 2.5-fold, at least about 3.0-fold, or at least about 4.0-fold.

The amount of sucrose, and thus another measure of sweetness, in a reference solution may be described in degrees Brix (° Bx). One degree Brix is 1 gram of sucrose in 100 grams of solution and represents the strength of the solution as percentage by weight (% w/w) (strictly speaking, by mass).

In some embodiments, the at least one dihydrochalcone compound described herein is present in the composition in an amount such that, when the composition is added to a consumable, the consumable has a sweetness equivalent to at least about 8 degrees Brix, such as, for example, about 8 degrees Brix, about 9 degrees Brix, about 10 degrees Brix, about 11 degrees Brix or about 12 degrees Brix.

In other embodiments, the at least one dihydrochalcone compound described herein is present in the composition in an amount such that, when the composition added to a consumable, the Brix of the consumable increases by at least 1 degree Brix, such as, for example, at least 2 degrees Brix, at least 3 degrees Brix, at least 4 degrees Brix or at least 5 degrees Brix. In other embodiments, the at least one dihydrochalcone compound described herein is present in the composition in an amount such that, when the composition is added to a consumable, one or more taste attributes of the sweetener are modulated making the consumable taste more like a sucrose-sweetened consumable compared to the same one or more taste attributes of the consumable in the absence of the at least one dihydrochalcone. Exemplary taste attribute modulations include decreasing or eliminating bitterness, decreasing or eliminating bitter linger, decreasing or eliminating sourness, decreasing or eliminating astringency, decreasing or eliminating saltiness, decreasing or eliminating metallic notes, improving mouthfeel, decreasing or eliminating sweetness linger, and increasing sweetness onset. Multiple taste attributes of the sweetener can be modulated simultaneously, such that the consumable, overall, has more sucrose-sweetened characteristics. Methods of quantifying improvement in sucrose-sweetened characteristics are known in the art and includes, e.g., taste testing and histogram mapping.

It should be noted that the comparisons are between (i) the consumable containing the at least one sweetener and at least one dihydrochalcone compound described herein and (ii) the consumable containing the at least one sweetener— but not the at least one dihydrochalcone compound described herein.

Consumables comprising at least one sweetener and at least one dihydrochalcone compound described herein are also provided.

The at least one dihydrochalcone compound described herein is typically present in the consumable in an amount effective to enhance the sweetness thereof and/or modulate one or more taste attributes of the sweetener to make the consumable taste more like a sucrose-sweetened consumable. In one embodiment, the at least one dihydrochalcone compound described herein is present in an amount at or below the dihydrochalcone's sweetness recognition threshold concentration, i.e. an amount that does not provide sweetness when tasted alone Typically, the at least one dihydrochalcone compound described herein is present in the consumable in an amount effective to enhance the sucrose equivalence (SE) of the consumable by at least 1.2-fold when compared to the SE of the consumable in the absence of the at least one dihydrochalcone, such as for example, at least about 1.3-fold, at least about 1.4-fold, at least about 1.5-fold, at least about 1.6-fold, at least about 1.7-fold, at least about 1.8-fold, at least about 1.9-fold and at least about 2.0-fold.

In some embodiments, the at least one dihydrochalcone compound described herein is present in the consumable in an amount effective to provide a sweetness equivalent to at least about 8 degrees Brix, such as, for example, about 8 degrees Brix, about 9 degrees Brix, about 10 degrees Brix, about 11 degrees Brix or about 12 degrees Brix.

In other embodiments, the at least one dihydrochalcone compound described herein is present in the consumable in an amount effective to increase the degrees Brix of the consumable by at least 1 degree compared to the degrees Brix of the consumable in the absence of the at least one dihydrochalcone, such as, for example, at least 2 degrees Brix, at least 3 degrees Brix, at least 4 degrees Brix or at least 5 degrees Brix.

In other embodiments, the at least one dihydrochalcone compound of Formula I is present in the consumable in an amount effective to modulate one or more taste attributes of the sweetener to make the consumable taste more like a sucrose-sweetened consumable. Exemplary taste attribute modulations include decreasing or eliminating bitterness, decreasing or eliminating bitter linger, decreasing or eliminating sourness, decreasing or eliminating astringency, decreasing or eliminating saltiness, decreasing or eliminating metallic notes, improving mouthfeel, decreasing or eliminating sweetness linger, and increasing sweetness onset. Multiple taste attributes of the sweetener can be modulated simultaneously, such that the consumable, overall, has more sucrose-sweetened characteristics. Methods of quantifying improvement in sucrose-sweetened characteristics are known in the art and includes taste testing and histogram mapping.

The particular concentration of the at least one dihydrochalcone compound described herein and the sweetener will vary depending on the particular dihydrochalcone compound(s) and sweetener(s).

In one embodiment, the at least one dihydrochalcone compound described herein is present in the consumable in a concentration from about 1 ppm to about 50 ppm, such as, for example, from about 1 ppm to about 45 ppm, from about 1 ppm to about 40 ppm, from about 1 ppm to about 35 ppm, from about 1 ppm to about 30 ppm, from about 1 ppm to about 25 ppm, from about 1 ppm to about 20 ppm, from about 1 ppm to about 15 ppm, from about 1 ppm to about 10 ppm and from about 1 ppm to about 5 ppm. In another embodiment, the at least one dihydrochalcone is present in the consumable in a concentration from about 5 ppm to about 40 ppm, such as, for example, from about 5 ppm to about 35 ppm, from about 5 ppm to about 20 ppm, from about 20 to about 40 ppm, from about 20 ppm to about 30 ppm or from about 30 ppm to about 40 ppm.

In one embodiment, the at least one sweetener described herein is present in the consumable in a concentration from about 50 ppm to about 600 ppm, such as, for example, about 50 ppm to about 500 ppm, from about 50 ppm to about 400 ppm, from about 50 ppm to about 300 ppm, from about 50 ppm to about 300 ppm, from about 50 ppm to about 200 ppm, from about 50 ppm to about 100 ppm, about 100 ppm to about 600 ppm, about 100 ppm to about 500 ppm, about 100 ppm to about 400 ppm, about 100 ppm to about 300 ppm, about 100 ppm to about 200 ppm, about 200 ppm to about 600 ppm, about 200 ppm to about 500 ppm, about 200 ppm to about 400 ppm, about 200 ppm to about 300 ppm, about 300 ppm to about 600 ppm, about 300 ppm to about 500 ppm, about 300 ppm to about 400 ppm, about 400 ppm to about 600 ppm, about 400 ppm to about 500 ppm and about 500 ppm to about 600 ppm.

The weight ratio of at least one sweetener to the at least one dihydrochalcone compound described herein can also vary, as discussed above.

In a particular embodiment, a consumable comprises at least one dihydrochalcone compound described herein and at least one sweetener is provided, wherein the at least one dihydrochalcone is present in an amount effective to enhance the SE of the consumable by at least about 1.2-fold when compared to the SE of the consumable in the absence of the at least one dihydrochalcone.

In one embodiment, the consumable with enhanced sweetness has a SE of about 2% (w/v) or greater, such as, for example, about 3% or greater, about 4% or greater, about 5% or greater, about 6% or greater, about 7% or greater, about 8% or greater, about 9% or greater, about 10% or greater, about 11% or greater, about 12% or greater, about 13% or greater or about 14% or greater.

In another embodiment, the consumable with enhanced sweetness has a Brix level of about 3 to about 12, such as, for example, about 3 degrees Brix or greater, about 4 degrees Brix or greater, about 5 degrees Brix or greater, about 5 degrees Brix or greater, about 7 degrees Brix or greater, about 8 degrees Brix or greater, about 9 degrees Brix or greater, about 10 degrees Brix or greater and about 11 degrees Brix or greater.

Exemplary consumables include but are not limited to edible gel mixes and compositions, dental compositions, foodstuffs (confections, condiments, chewing gum, cereal compositions, baked goods, dairy products, and tabletop sweetener compositions) beverages and beverage products.

Consumables can optionally include one or more additional additives. Exemplary additives including, but are not limited to, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, bitter compounds, flavorants and flavoring ingredients, astringent compounds, proteins or protein hydrolysates, surfactants, emulsifiers, weighing agents, gums, antioxidants, colorants, flavonoids, alcohols, polymers and combinations thereof.

In one embodiment, the consumable further comprises one or more polyols. The term "polyol", as used herein, refers to a molecule that contains more than one hydroxyl group. A polyol may be a diol, triol, or a tetraol which contains 2, 3, and 4 hydroxyl groups respectively. A polyol also may contain more than 4 hydroxyl groups, such as a pentaol, hexaol, heptaol, or the like, which contain 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group.

Non-limiting examples of polyols in some embodiments include maltitol, mannitol, sorbitol, lactitol, xylitol, isomalt, propylene glycol, glycerol (glycerin), threitol, galactitol, palatinose, reduced isomalto-oligosaccharides, reduced xylo-oligosaccharides, reduced gentio-oligosaccharides, reduced maltose syrup, reduced glucose syrup, and sugar alcohols or any other carbohydrates capable of being reduced which do not adversely affect taste.

Suitable amino acid additives include, but are not limited to, aspartic acid, arginine, glycine, glutamic acid, proline, threonine, theanine, cysteine, cystine, alanine, valine, tyrosine, leucine, arabinose, trans-4-hydroxyproline, isoleucine, asparagine, serine, lysine, histidine, ornithine, methionine, carnitine, aminobutyric acid ($\alpha$-, $\beta$-, and/or $\delta$-isomers), glutamine, hydroxyproline, taurine, norvaline, sarcosine, and their salt forms such as sodium or potassium salts or acid salts. The amino acid additives also may be in the D- or L-configuration and in the mono-, di-, or tri-form of the same or different amino acids. Additionally, the amino acids may be $\alpha$-, $\beta$-, $\gamma$- and/or $\delta$-isomers if appropriate. Combinations of the foregoing amino acids and their corresponding salts (e.g., sodium, potassium, calcium, magnesium salts or other alkali or alkaline earth metal salts thereof, or acid salts) also are suitable additives in some embodiments. The amino acids may be natural or synthetic. The amino acids also may be modified. Modified amino acids refers to any amino acid wherein at least one atom has been added, removed, substituted, or combinations thereof (e.g., N-alkyl amino acid, N-acyl amino acid, or N-methyl amino acid). Non-limiting examples of modified amino acids include amino acid derivatives such as trimethyl glycine, N-methyl-glycine, and N-methyl-alanine. As used herein, modified amino acids encompass both modified and unmodified amino acids. As used herein, amino acids also encompass both peptides and polypeptides (e.g., dipeptides, tripeptides, tetrapeptides, and pentapeptides) such as glutathione and L-alanyl-L-glutamine. Suitable polyamino acid additives include poly-L-aspartic acid, poly-L-lysine (e.g., poly-L-$\alpha$-lysine or poly-L-$\varepsilon$-lysine), poly-L-ornithine (e.g., poly-L-$\alpha$-ornithine or poly-L-$\varepsilon$-ornithine), poly-L-arginine, other polymeric forms of amino acids, and salt forms thereof (e.g., calcium, potassium, sodium, or magnesium salts such as L-glutamic acid mono sodium salt). The poly-amino acid additives also may be in the D- or L-configuration. Additionally, the poly-amino acids may be $\alpha$-, $\beta$-, $\gamma$-, $\delta$-, and $\varepsilon$-isomers if appropriate. Combinations of the foregoing poly-amino acids and their corresponding salts (e.g., sodium, potassium, calcium, magnesium salts or other alkali or alkaline earth metal salts thereof or acid salts) also are suitable additives in some embodiments. The poly-amino acids described herein also may comprise co-polymers of different amino acids. The poly-amino acids may be natural or synthetic. The poly-amino acids also may be modified, such that at least one atom has been added, removed, substituted, or combinations thereof (e.g., N-alkyl poly-amino acid or N-acyl poly-amino acid). As used herein, poly-amino acids encompass both modified and unmodified poly-amino acids. For example, modified poly-amino acids include, but are not limited to, poly-amino acids of various molecular weights (MW), such as poly-L-$\alpha$-lysine with a MW of 1,500, MW of 6,000, MW of 25,200, MW of 63,000, MW of 83,000, or MW of 300,000.

Suitable sugar acid additives include, but are not limited to, aldonic, uronic, aldaric, alginic, gluconic, glucuronic, glucaric, galactaric, galacturonic, and salts thereof (e.g., sodium, potassium, calcium, magnesium salts or other physiologically acceptable salts), and combinations thereof.

Suitable nucleotide additives include, but are not limited to, inosine monophosphate ("IMP"), guanosine monophosphate ("GMP"), adenosine monophosphate ("AMP"), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, alkali or alkaline earth metal salts thereof, and combinations thereof. The nucleotides described herein also may comprise nucleotide-related additives, such as nucleosides or nucleic acid bases (e.g., guanine, cytosine, adenine, thymine, uracil).

Suitable organic acid additives include any compound which comprises a —COOH moiety, such as, for example, C2-C30 carboxylic acids, substituted hydroxyl C2-C30 carboxylic acids, butyric acid (ethyl esters), substituted butyric acid (ethyl esters), benzoic acid, substituted benzoic acids (e.g., 2,4-dihydroxybenzoic acid), substituted cinnamic acids, hydroxyacids, substituted hydroxybenzoic acids, anisic acid substituted cyclohexyl carboxylic acids, tannic acid, aconitic acid, lactic acid, tartaric acid, citric acid, isocitric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, caffeic acid, bile acids, acetic acid, ascorbic acid, alginic acid, erythorbic acid, polyglutamic acid, glucono delta lactone, and their alkali or alkaline earth metal salt derivatives thereof. In addition, the organic acid additives also may be in either the D- or L-configuration.

Suitable organic acid additive salts include, but are not limited to, sodium, calcium, potassium, and magnesium salts of all organic acids, such as salts of citric acid, malic acid, tartaric acid, fumaric acid, lactic acid (e.g., sodium lactate), alginic acid (e.g., sodium alginate), ascorbic acid (e.g., sodium ascorbate), benzoic acid (e.g., sodium benzoate or potassium benzoate), sorbic acid and adipic acid. The examples of the organic acid additives described optionally may be substituted with at least one group chosen from hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfinyl, sulfamyl, carboxalkoxy, carboxamido, phosphonyl, phosphinyl, phosphoryl, phosphino, thioester, thioether, anhydride, oximino, hydrazino, carbamyl, phosphor or phosphonato. In particular embodiments, the organic acid additive is present in the sweetener composition in an amount effective to provide a concentration from about 10 ppm to about 5,000 ppm when present in a consumable, such as, for example, a beverage.

Suitable inorganic acid additives include, but are not limited to, phosphoric acid, phosphorous acid, polyphosphoric acid, hydrochloric acid, sulfuric acid, carbonic acid, sodium dihydrogen phosphate, and alkali or alkaline earth metal salts thereof (e.g., inositol hexaphosphate Mg/Ca).

Suitable bitter compound additives include, but are not limited to, caffeine, quinine, urea, bitter orange oil, naringin, quassia, and salts thereof.

Suitable flavorants and flavoring ingredient additives include, but are not limited to, vanillin, vanilla extract, mango extract, cinnamon, citrus, coconut, ginger, viridiflorol, almond, menthol (including menthol without mint), grape skin extract, and grape seed extract. "Flavorant" and "flavoring ingredient" are synonymous and can include natural or synthetic substances or combinations thereof. Flavorants also include any other substance which imparts flavor and may include natural or non-natural (synthetic) substances which are safe for human or animals when used in a generally accepted range. Non-limiting examples of proprietary flavorants include Dohler™ Natural Flavoring Sweetness Enhancer K14323 (Dohler™, Darmstadt, Germany), Symrise™ Natural Flavor Mask for Sweeteners 161453 and 164126 (Symrise™, Holzminden, Germany), Natural Advantage™ Bitterness Blockers 1, 2, 9 and 10 (Natural Advantage™, Freehold, N.J., U.S.A.), and Sucramask™ (Creative Research Management, Stockton, California, U.S.A.).

Suitable polymer additives include, but are not limited to, chitosan, pectin, pectic, pectinic, polyuronic, polygalacturonic acid, starch, food hydrocolloid or crude extracts thereof (e.g., gum acacia senegal (Fibergum™), gum acacia seyal, carageenan), poly-L-lysine (e.g., poly-L-α-lysine or poly-L-ε-lysine), poly-L-ornithine (e.g., poly-L-α-ornithine or poly-L-ε-ornithine), polypropylene glycol, polyethylene glycol, poly(ethylene glycol methyl ether), polyarginine, polyaspartic acid, polyglutamic acid, polyethylene imine, alginic acid, sodium alginate, propylene glycol alginate, and sodium polyethyleneglycolalginate, sodium hexametaphosphate and its salts, and other cationic polymers and anionic polymers.

Suitable protein or protein hydrolysate additives include, but are not limited to, bovine serum albumin (BSA), whey protein (including fractions or concentrates thereof such as 90% instant whey protein isolate, 34% whey protein, 50% hydrolyzed whey protein, and 80% whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, asparagine, glutamine, arginine, valine, isoleucine, leucine, norvaline, methionine, proline, tyrosine, hydroxyproline, and the like), collagen (e.g., gelatin), partially hydrolyzed collagen (e.g., hydrolyzed fish collagen), and collagen hydrolysates (e.g., porcine collagen hydrolysate).

Suitable surfactant additives include, but are not limited to, polysorbates (e.g., polyoxyethylene sorbitan monooleate (polysorbate 80), polysorbate 20, polysorbate 60), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltrimethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers, and the like.

Suitable flavonoid additives are classified as flavonols, flavones, flavanones, flavan-3-ols, isoflavones, or anthocyanidins. Non-limiting examples of flavonoid additives include, but are not limited to, catechins (e.g., green tea extracts such as Polyphenon™ 60, Polyphenon™ 30, and Polyphenon™ 25 (Mitsui Norin Co., Ltd., Japan), polyphenols, rutins (e.g., enzyme modified rutin Sanmelin™ AO (San-fi Gen F.F.I., Inc., Osaka, Japan)), neohesperidin, naringin, neohesperidin dihydrochalcone, and the like.

Suitable alcohol additives include, but are not limited to, ethanol. In particular embodiments, the alcohol additive is present in the consumable in a concentration from about 625 ppm to about 10,000 ppm.

Suitable astringent compound additives include, but are not limited to, tannic acid, europium chloride ($EuCl_3$), gadolinium chloride ($GdCl_3$), terbium chloride ($TbCl_3$), alum, tannic acid, and polyphenols (e.g., tea polyphenols). The astringent additive is present in the sweetened composition in a concentration from about 10 ppm to about 5,000 ppm.

The consumables provided herein can also contain one or more functional ingredients, which provide a real or perceived heath benefit to the composition. Functional ingredients include, but are not limited to, saponins, antioxidants, dietary fiber sources, fatty acids, vitamins, glucosamine, minerals, preservatives, hydration agents, probiotics, prebiotics, weight management agents, osteoporosis management agents, phytoestrogens, long chain primary aliphatic saturated alcohols, phytosterols and combinations thereof.

Functional ingredients include, but are not limited to, saponins, antioxidants, dietary fiber sources, fatty acids, vitamins, glucosamine, minerals, preservatives, hydration agents, probiotics, prebiotics, weight management agents, osteoporosis management agents, phytoestrogens, long chain primary aliphatic saturated alcohols, phytosterols and combinations thereof.

Examples of suitable antioxidants for embodiments of this invention include, but are not limited to, vitamins, vitamin cofactors, minerals, hormones, carotenoids, carotenoid terpenoids, non-carotenoid terpenoids, flavonoids, flavonoid polyphenolics (e.g., bioflavonoids), flavonols, flavones, phenols, polyphenols, esters of phenols, esters of polyphenols, nonflavonoid phenolics, isothiocyanates, and combinations thereof. In some embodiments, the antioxidant is vitamin A, vitamin C, vitamin E, ubiquinone, mineral selenium, manganese, melatonin, α-carotene, β-carotene, lycopene, lutein, zeanthin, crypoxanthin, reservatol, eugenol, quercetin, catechin, gossypol, hesperetin, curcumin, ferulic acid, thymol, hydroxytyrosol, tumeric, thyme, olive oil, lipoic acid, glutathinone, gutamine, oxalic acid, tocopherol-derived compounds, butylated hydroxyanisole (BHA), butylated hydroxytoluene (BHT), ethylenediaminetetraacetic acid (EDTA), tert-butylhydroquinone, acetic acid, pectin, tocotrienol, tocopherol, coenzyme Q10, zeaxanthin, astaxanthin, canthaxantin, saponins, limonoids, kaempfedrol, myricetin, isorhamnetin, proanthocyanidins, quercetin, rutin, luteolin, apigenin, tangeritin, hesperetin, naringenin, erodictyol, flavan-3-ols (e.g., anthocyanidins), gallocatechins, epicatechin and its gallate forms, epigallocatechin and its gallate forms (ECGC) theaflavin and its gallate forms, thearubigins, isoflavone, phytoestrogens, genistein, daidzein, glycitein, anythocyanins, cyaniding, delphinidin, malvidin, pelargonidin, peonidin, petunidin, ellagic acid, gallic acid, salicylic acid, rosmarinic acid, cinnamic acid and its derivatives (e.g., ferulic acid), chlorogenic acid, chicoric acid, gallotannins, ellagitannins, anthoxanthins, betacyanins and other plant pigments, silymarin, citric acid, lignan, antinutrients, bilirubin, uric acid, R-α-lipoic acid, N-acetylcysteine, emblicanin, apple extract, apple skin extract (applephenon), rooibos extract red, rooibos extract, green, hawthorn berry extract, red raspberry extract, green coffee antioxidant (GCA), aronia extract 20%, grape seed extract (VinOseed), cocoa extract, hops extract, mangosteen extract, mangosteen hull extract, cranberry extract, pomegranate extract, pomegranate hull extract, pomegranate seed extract, hawthorn berry extract, pomella pomegranate extract, cinnamon bark extract, grape skin extract, bilberry extract, pine bark extract, pycnogenol, elderberry extract, mulberry root extract, wolfberry (gogi) extract, blackberry extract, blueberry extract, blueberry leaf extract, raspberry extract, turmeric extract, citrus bioflavonoids, black currant, ginger, acai powder, green coffee bean extract, green tea extract, and phytic acid, or combinations thereof. In alternate embodiments, the antioxidant is a synthetic antioxidant such as butylated hydroxytolune or butylated hydroxyanisole, for example. Other sources of suitable antioxidants for embodiments of this invention include, but are not limited to, fruits, vegetables, tea, cocoa, chocolate, spices, herbs, rice, organ meats from livestock, yeast, whole grains, or cereal grains.

Particular antioxidants belong to the class of phytonutrients called polyphenols (also known as "polyphenolics"), which are a group of chemical substances found in plants, characterized by the presence of more than one phenol group per molecule. Suitable polyphenols for embodiments of this invention include catechins, proanthocyanidins, procyanidins, anthocyanins, quercerin, rutin, reservatrol, isoflavones, curcumin, punicalagin, ellagitannin, hesperidin, naringin, citrus flavonoids, chlorogenic acid, other similar materials, and combinations thereof.

In particular embodiments, the antioxidant is a catechin such as, for example, epigallocatechin gallate (EGCG). Suitable sources of catechins for embodiments of this invention include, but are not limited to, green tea, white tea, black tea, oolong tea, chocolate, cocoa, red wine, grape seed, red grape skin, purple grape skin, red grape juice, purple grape juice, berries, pycnogenol, and red apple peel.

In some embodiments, the antioxidant is chosen from proanthocyanidins, procyanidins or combinations thereof. Suitable sources of proanthocyanidins and procyanidins for embodiments of this invention include, but are not limited to, red grapes, purple grapes, cocoa, chocolate, grape seeds, red wine, cacao beans, cranberry, apple peel, plum, blueberry, black currants, choke berry, green tea, sorghum, cinnamon, barley, red kidney bean, pinto bean, hops, almonds, hazelnuts, pecans, pistachio, pycnogenol, and colorful berries.

In particular embodiments, the antioxidant is an anthocyanin. Suitable sources of anthocyanins for embodiments of this invention include, but are not limited to, red berries, blueberries, bilberry, cranberry, raspberry, cherry, pomegranate, strawberry, elderberry, choke berry, red grape skin, purple grape skin, grape seed, red wine, black currant, red currant, cocoa, plum, apple peel, peach, red pear, red cabbage, red onion, red orange, and blackberries.

In some embodiments, the antioxidant is chosen from quercetin, rutin or combinations thereof. Suitable sources of quercetin and rutin for embodiments of this invention include, but are not limited to, red apples, onions, kale, bog whortleberry, lingonberrys, chokeberry, cranberry, blackberry, blueberry, strawberry, raspberry, black currant, green tea, black tea, plum, apricot, parsley, leek, broccoli, chili pepper, berry wine and ginkgo.

In some embodiments, the antioxidant is reservatrol. Suitable sources of reservatrol for embodiments of this invention include, but are not limited to, red grapes, peanuts, cranberry, blueberry, bilberry, mulberry, Japanese Itadori tea, and red wine.

In particular embodiments, the antioxidant is an isoflavone. Suitable sources of isoflavones for embodiments of this invention include, but are not limited to, soy beans, soy products, legumes, alfalfa sprouts, chickpeas, peanuts, and red clover.

In some embodiments, the antioxidant is curcumin. Suitable sources of curcumin for embodiments of this invention include, but are not limited to, turmeric and mustard.

In particular embodiments, the antioxidant is chosen from punicalagin, ellagitannin or combinations thereof. Suitable sources of punicalagin and ellagitannin for embodiments of this invention include, but are not limited to, pomegranate, raspberry, strawberry, walnut, and oak-aged red wine.

In some embodiments, the antioxidant is a citrus flavonoid, such as hesperidin or naringin. Suitable sources of citrus flavonoids, such as hesperidin or naringin, for embodiments of this invention include, but are not limited to, oranges, grapefruits, and citrus juices.

In particular embodiments, the antioxidant is chlorogenic acid. Suitable sources of chlorogenic acid for embodiments of this invention include, but are not limited to, green coffee, yerba mate, red wine, grape seed, red grape skin, purple grape skin, red grape juice, purple grape juice, apple juice, cranberry, pomegranate, blueberry, strawberry, sunflower, Echinacea, pycnogenol, and apple peel.

Suitable dietary fibers include, but are not limited to, non-starch polysaccharides, lignin, cellulose, methylcellulose, the hemicelluloses, β-glucans, pectins, gums, mucilage, waxes, inulins, oligosaccharides, fructooligosaccharides, cyclodextrins, chitins, and combinations thereof.

Food sources of dietary fiber include, but are not limited to, grains, legumes, fruits, and vegetables. Grains providing dietary fiber include, but are not limited to, oats, rye, barley, wheat. Legumes providing fiber include, but are not limited to, peas and beans such as soybeans. Fruits and vegetables providing a source of fiber include, but are not limited to, apples, oranges, pears, bananas, berries, tomatoes, green beans, broccoli, cauliflower, carrots, potatoes, celery. Plant foods such as bran, nuts, and seeds (such as flax seeds) are also sources of dietary fiber. Parts of plants providing dietary fiber include, but are not limited to, the stems, roots, leaves, seeds, pulp, and skin.

Fatty acids any straight chain monocarboxylic acid and includes saturated fatty acids, unsaturated fatty acids, long chain fatty acids, medium chain fatty acids, short chain fatty acids, fatty acid precursors (including omega-9 fatty acid precursors), and esterified fatty acids. As used herein, "long chain polyunsaturated fatty acid" refers to any polyunsaturated carboxylic acid or organic acid with a long aliphatic tail. Suitable omega-3 fatty acids include, but are not limited to, linolenic acid, alpha-linolenic acid, eicosapentaenoic acid, docosahexaenoic acid, stearidonic acid, eicosatetraenoic acid and combinations thereof. Suitable omega-6 fatty acids include, but are not limited to, linoleic acid, gamma-linolenic acid, dihommo-gamma-linolenic acid, arachidonic acid, eicosadienoic acid, docosadienoic acid, adrenic acid, docosapentaenoic acid and combinations thereof. Suitable esterified fatty acids for embodiments of the present invention include, but are not limited to, monoacylglycerols containing omega-3 and/or omega-6 fatty acids, diacylglycerols containing omega-3 and/or omega-6 fatty acids, or triacylglycerols containing omega-3 and/or omega-6 fatty acids and combinations thereof.

Suitable vitamins include, vitamin A, vitamin D, vitamin E, vitamin K, vitamin B1, vitamin B2, vitamin B3, vitamin B5, vitamin B6, vitamin B7, vitamin B9, vitamin B12, and vitamin C. Various other compounds have been classified as vitamins by some authorities. These compounds may be termed pseudo-vitamins and include, but are not limited to, compounds such as ubiquinone (coenzyme Q10), pangamic acid, dimethylglycine, taestrile, amygdaline, flavanoids, para-aminobenzoic acid, adenine, adenylic acid, and s-methylmethionine. As used herein, the term vitamin includes pseudo-vitamins.

Minerals are selected from bulk minerals, trace minerals or combinations thereof. Non-limiting examples of bulk minerals include calcium, chlorine, magnesium, phosphorous, potassium, sodium, and sulfur. Non-limiting examples of trace minerals include chromium, cobalt, copper, fluorine, iron, manganese, molybdenum, selenium, zinc, and iodine. Although iodine generally is classified as a trace mineral, it is required in larger quantities than other trace minerals and often is categorized as a bulk mineral.

In other particular embodiments of this invention, the mineral is a trace mineral, believed to be necessary for human nutrition, non-limiting examples of which include bismuth, boron, lithium, nickel, rubidium, silicon, strontium, tellurium, tin, titanium, tungsten, and vanadium.

Preservatives are selected from antimicrobials, antioxidants, antienzymatics or combinations thereof. Non-limiting examples of antimicrobials include sulfites, propionates, benzoates, sorbates, nitrates, nitrites, bacteriocins, salts, sugars, acetic acid, dimethyl dicarbonate (DMDC), ethanol, and ozone. Sulfites include, but are not limited to, sulfur dioxide, sodium bisulfite, and potassium hydrogen sulfite. Propionates include, but are not limited to, propionic acid, calcium propionate, and sodium propionate. Benzoates include, but are not limited to, sodium benzoate and benzoic acid. Sorbates include, but are not limited to, potassium sorbate, sodium sorbate, calcium sorbate, and sorbic acid. Nitrates and nitrites include, but are not limited to, sodium nitrate and sodium nitrite. In yet another particular embodiment, the at least one preservative is a bacteriocin, such as, for example, nisin. In another particular embodiment, the preservative is ethanol. In still another particular embodiment, the preservative is ozone. Antienzymatics suitable for use as preservatives in particular embodiments of the invention include ascorbic acid, citric acid, and metal chelating agents such as ethylenediaminetetraacetic acid (EDTA).

Hydration products can be electrolytes, non-limiting examples of which include sodium, potassium, calcium, magnesium, chloride, phosphate, bicarbonate, and combinations thereof. Suitable electrolytes for use in particular embodiments of this invention are also described in U.S. Pat. No. 5,681,569, the disclosure of which is expressly incorporated herein by reference. Non-limiting examples of salts for use in particular embodiments include chlorides, carbonates, sulfates, acetates, bicarbonates, citrates, phosphates, hydrogen phosphates, tartrates, sorbates, citrates, benzoates, or combinations thereof. In particular embodiments of this invention, the hydration product is a carbohydrate to supplement energy stores burned by muscles. Suitable carbohydrates for use in particular embodiments of this invention are described in U.S. Pat. Nos. 4,312,856, 4,853,237, 5,681,569, and 6,989,171, the disclosures of which are expressly incorporated herein by reference. Non-limiting examples of suitable carbohydrates include monosaccharides, disaccharides, oligosaccharides, complex polysaccharides or combinations thereof. Non-limiting examples of suitable types of monosaccharides for use in particular embodiments include trioses, tetroses, pentoses, hexoses, heptoses, octoses, and nonoses. Non-limiting examples of specific types of suitable monosaccharides include glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, and sialose. Non-limiting examples of suitable disaccharides include sucrose, lactose, and maltose. Non-limiting examples of suitable oligosaccharides include saccharose, maltotriose, and maltodextrin. In other particular embodiments, the carbohydrates are provided by a corn syrup, a beet sugar, a cane sugar, a juice, or a tea. In another particular embodiment, the hydration is a flavanol that provides cellular rehydration. Non-limiting examples of suitable flavanols for use in particular embodiments of this invention include catechin, epicatechin, gallocatechin, epigallocatechin, epicatechin gallate, epigallocatechin 3-gallate, theaflavin, theaflavin 3-gallate, theaflavin 3'-gallate, theaflavin 3,3' gallate, thearubigin or combinations thereof. In a particular embodiment, the hydration product is a glycerol solution to enhance exercise endurance.

Probiotics comprise microorganisms that benefit health when consumed in an effective amount. Probiotics may include, without limitation, bacteria, yeasts, and fungi.

Examples of probiotics include, but are not limited to, bacteria of the genus *Lactobacilli, Bifidobacteria, Streptococci*, or combinations thereof. In particular embodiments of the invention, the at least one probiotic is chosen from the genus *Lactobacilli*. *Lactobacilli* (i.e., bacteria of the genus *Lactobacillus*, hereinafter "*L.*"). Non-limiting examples of species of *Lactobacilli* found in the human intestinal tract include *L. acidophilus, L. casei, L. fermentum, L. salivaroes, L. brevis, L. leichmannii, L. plantarum, L. cellobiosus, L. reuteri, L. rhamnosus, L. GG, L. bulgaricus*, and *L. thermophilus*. According to other particular embodiments of this invention, the probiotic is chosen from the genus *Bifidobacteria*. Non-limiting species of *Bifidobacteria* found in the human gastrointestinal tract include *B. angulatum, B. animalis, B. asteroides, B. bifidum, B. bourn, B. breve, B. catenulatum, B. choerinum, B. coryneforme, B. cuniculi, B. dentium, B. gallicum, B. gallinarum, B indicum, B. longum, B. magnum, B. merycicum, B. minimum, B. pseudocatenulatum, B. pseudolongum, B. psychraerophilum, B. pullorum, B. ruminantium, B. saeculare, B. scardovii, B. simiae, B. subtile, B. thermacidophilum, B. thermophilum, B. urinalis*, and *B.* sp. According to other particular embodiments of this invention, the probiotic is chosen from the genus *Streptococcus*. *Streptococcus thermophilus* is a gram-positive facultative anaerobe. Other non-limiting probiotic species of this bacteria include *Streptococcus salivarus* and *Streptococcus cremoris*.

Prebiotics are compositions that promote the growth of beneficial bacteria in the intestines. Prebiotics include, without limitation, mucopolysaccharides, oligosaccharides, polysaccharides, amino acids, vitamins, nutrient precursors, proteins and combinations thereof. According to a particular embodiment of this invention, the prebiotic is chosen from dietary fibers, including, without limitation, polysaccharides and oligosaccharides. Non-limiting examples of oligosaccharides that are categorized as prebiotics in accordance with particular embodiments of this invention include fructooligosaccharides, inulins, isomalto-oligosaccharides, lactilol, lactosucrose, lactulose, pyrodextrins, soy oligosaccharides, transgalacto-oligosaccharides, and xylo-oligosaccharides. According to other particular embodiments of the invention, the prebiotic is an amino acid.

As used herein, "a weight management agent" includes an appetite suppressant and/or a thermogenesis agent. As used herein, the phrases "appetite suppressant", "appetite satiation compositions", "satiety agents", and "satiety ingredients" are synonymous. The phrase "appetite suppressant" describes macronutrients, herbal extracts, exogenous hormones, anorectics, anorexigenics, pharmaceutical drugs, and combinations thereof, that when delivered in an effective amount, suppress, inhibit, reduce, or otherwise curtail a person's appetite. The phrase "thermogenesis agent" describes macronutrients, herbal extracts, exogenous hormones, anorectics, anorexigenics, pharmaceutical drugs, and combinations thereof, that when delivered in an effective amount, activate or otherwise enhance a person's thermogenesis or metabolism.

Suitable weight management agents include macronutrients selected from the group consisting of proteins, carbohydrates, dietary fats, and combinations thereof. Carbohydrates generally comprise sugars, starches, cellulose and gums that the body converts into glucose for energy. Non-limiting examples of carbohydrates include polydextrose; inulin; monosaccharide-derived polyols such as erythritol, mannitol, xylitol, and sorbitol; disaccharide-derived alcohols such as isomalt, lactitol, and maltitol; and hydrogenated starch hydrolysates. Carbohydrates are described in more detail herein below. Dietary fats are lipids comprising combinations of saturated and unsaturated fatty acids. Polyunsaturated fatty acids have been shown to have a greater satiating power than mono-unsaturated fatty acids. Accordingly, the dietary fats embodied herein desirably comprise poly-unsaturated fatty acids, non-limiting examples of which include triacylglycerols.

In a particular embodiment, the weight management agents is an herbal extract. Non-limiting examples of plants whose extracts have appetite suppressant properties include plants of the genus *Hoodia, Trichocaulon, Caralluma, Stapelia, Orbea, Asclepias*, and *Camelia*. Other embodiments include extracts derived from Gymnema Sylvestre, Kola Nut, Citrus Auran tium, Yerba Mate, Griffonia Simplicifolia, Guarana, myrrh, guggul Lipid, and black current seed oil. In a particular embodiment, the herbal extract is derived from a plant of the genus *Hoodia*, species of which include *H. alstonii, H. currorii, H. dregei, H. flava, H. gordonii, H. jutatae, H. mossamedensis, H. officinalis, H. parviflorai, H. pedicellata, H. pilifera, H. ruschii*, and *H. triebneri*. *Hoodia* plants are stem succulents native to southern Africa. In another particular embodiment, the herbal extract is derived from a plant of the genus *Caralluma*, species of which include *C. indica, C. fimbriata, C. attenuate, C. tuberculata, C. edulis, C. adscendens, C. stalagmifera, C. umbellate, C. penicillata, C. russeliana, C. retrospicens, C. Arabica*, and *C. lasiantha*. Carralluma plants belong to the same Subfamily as *Hoodia*, Asclepiadaceae. In another particular embodiment, the at least one herbal extract is derived from a plant of the genus *Trichocaulon*. *Trichocaulon* plants are succulents that generally are native to southern Africa, similar to *Hoodia*, and include the species *T. piliferum* and *T officinale*. In another particular embodiment, the herbal extract is derived from a plant of the genus *Stapelia* or *Orbea*, species of which include *S. gigantean* and *O. variegate*, respectively. Both *Stapelia* and *Orbea* plants belong to the same Subfamily as *Hoodia*, Asclepiadaceae. In another particular embodiment, the herbal extract is derived from a plant of the genus *Asclepias*. *Asclepias* plants also belong to the Asclepiadaceae family of plants. Non-limiting examples of *Asclepias* plants include *A. incarnate, A. curassayica, A. syriaca*, and *A. tuberose*. Not wishing to be bound by any theory, it is believed that the extracts comprise steroidal compounds, such as pregnane glycosides and pregnane aglycone, having appetite suppressant effects. In a particular embodiment, the weight management agent is an exogenous hormone having a weight management effect. Non-limiting examples of such hormones include CCK, peptide YY, ghrelin, bombesin and gastrin-releasing peptide (GRP), enterostatin, apolipoprotein A-IV, GLP-1, amylin, somastatin, and leptin.

In certain embodiments, the osteoporosis management agent is at least one calcium source, i.e. any compound containing calcium, including salt complexes, solubilized species, and other forms of calcium. Non-limiting examples of calcium sources include amino acid chelated calcium, calcium carbonate, calcium oxide, calcium hydroxide, calcium sulfate, calcium chloride, calcium phosphate, calcium hydrogen phosphate, calcium dihydrogen phosphate, calcium citrate, calcium malate, calcium citrate malate, calcium gluconate, calcium tartrate, calcium lactate, solubilized species thereof, and combinations thereof. According to a particular embodiment, the osteoporosis management agent is a magnesium soucrce, i.e. any compound containing magnesium, including salt complexes, solubilized species, and other forms of magnesium. Non-limiting examples of magnesium sources include magnesium chloride, magnesium citrate, magnesium gluceptate, magnesium gluconate, magnesium lactate, magnesium hydroxide, magnesium picolate, magnesium sulfate, solubilized species thereof, and mixtures thereof. In another particular embodiment, the magnesium source comprises an amino acid chelated or creatine chelated magnesium. In other embodiments, the osteoporosis agent is chosen from vitamins D, C, K, their precursors and/or beta-carotene and combinations thereof. Numerous plants and plant extracts also have been identified as being effective in the prevention and treatment of osteoporosis. Not wishing to be bound by any theory, it is believed that the plants and plant extracts stimulates bone morphogenic proteins and/or inhibits bone resorption, thereby stimulating bone regeneration and strength. Non-limiting examples of suitable plants and plant extracts as osteoporosis management agents include species of the genus *Taraxacum* and *Amelanchier*, as disclosed in U.S. Patent Publication No. 2005/0106215, and species of the genus *Lindera, Artemisia, Acorus, Carthamus, Carum, Cnidium, Curcuma, Cyperus, Juniperus, Prunus, Iris, Cichorium, Dodonaea, Epimedium, Erigonoum, Soya, Mentha, Ocimum, thymus, Tanacetum, Plantago, Spearmint, Bixa, Vitis, Rosemarinus, Rhus*, and *Anethum*, as disclosed in U.S. Patent Publication No. 2005/0079232.

Examples of suitable phytoestrogens for embodiments of this invention include, but are not limited to, isoflavones, stilbenes, lignans, resorcyclic acid lactones, coumestans, coumestrol, equol, and combinations thereof. Isoflavones belong to the group of phytonutrients called polyphenols. In general, polyphenols (also known as "polyphenolics"), are a group of chemical substances found in plants, characterized by the presence of more than one phenol group per molecule. Suitable phytoestrogen isoflavones in accordance with embodiments of this invention include genistein, daidzein, glycitein, biochanin A, formononetin, their respective naturally occurring glycosides and glycoside conjugates, matairesinol, secoisolariciresinol, enterolactone, enterodiol, textured vegetable protein, and combinations thereof.

Long-chain primary aliphatic saturated alcohols are a diverse group of organic compounds. The term long-chain refers to the fact that the number of carbon atoms in these compounds is at least 8 carbons. Non-limiting examples of particular long-chain primary aliphatic saturated alcohols for use in particular embodiments of the invention include the 8 carbon atom 1-octanol, the 9 carbon 1-nonanol, the 10 carbon atom 1-decanol, the 12 carbon atom 1-dodecanol, the 14 carbon atom 1-tetradecanol, the 16 carbon atom 1-hexadecanol, the 18 carbon atom 1-octadecanol, the 20 carbon atom 1-eicosanol, the 22 carbon 1-docosanol, the 24 carbon 1-tetracosanol, the 26 carbon 1-hexacosanol, the 27 carbon 1-heptacosanol, the 28 carbon 1-octanosol, the 29 carbon 1-nonacosanol, the 30 carbon 1-triacontanol, the 32 carbon 1-dotriacontanol, and the 34 carbon 1-tetracontanol. In a particularly desirable embodiment of the invention, the long-chain primary aliphatic saturated alcohols are policosanol. Policosanol is the term for a mixture of long-chain primary aliphatic saturated alcohols composed primarily of 28 carbon 1-octanosol and 30 carbon 1-triacontanol, as well as other alcohols in lower concentrations such as 22 carbon 1-docosanol, 24 carbon 1-tetracosanol, 26 carbon 1-hexacosanol, 27 carbon 1-heptacosanol, 29 carbon 1-nonacosanol, 32 carbon 1-dotriacontanol, and 34 carbon 1-tetracontanol.

At least 44 naturally-occurring phytosterols have been discovered, and generally are derived from plants, such as corn, soy, wheat, and wood oils; however, they also may be produced synthetically to form compositions identical to those in nature or having properties similar to those of naturally-occurring phytosterols. According to particular embodiments of this invention, non-limiting examples of phytosterols well known to those or ordinary skill in the art include 4-desmethylsterols (e.g., β-sitosterol, campesterol, stigmasterol, brassicasterol, 22-dehydrobrassicasterol, and Δ5-avenasterol), 4-monomethyl sterols, and 4,4-dimethyl sterols (triterpene alcohols) (e.g., cycloartenol, 24-methylenecycloartanol, and cyclobranol).

According to particular embodiments of this invention, non-limiting examples of phytostanols include β-sitostanol, campestanol, cycloartanol, and saturated forms of other triterpene alcohols.

Both phytosterols and phytostanols, as used herein, include the various isomers such as the α and β isomers (e.g., α-sitosterol and β-sitostanol, which comprise one of the most effective phytosterols and phytostanols, respectively, for lowering serum cholesterol in mammals). he phytosterols and phytostanols of the present invention also may be in their ester form. Non-limiting examples of suitable phytosterol and phytostanol esters include sitosterol acetate, sitosterol oleate, stigmasterol oleate, and their corresponding phytostanol esters. The phytosterols and phytostanols of the present invention also may include their derivatives.

Generally, the amount of functional ingredient in the composition varies widely depending on the particular composition and the desired functional ingredient. Those of ordinary skill in the art will readily ascertain the appropriate amount of functional ingredient for each composition.

In one embodiment, the consumable is a beverage or beverage product.

"Beverage product", as used herein, is a ready-to-drink beverage, a beverage concentrate, a beverage syrup, or a powdered beverage. Suitable ready-to-drink beverages include carbonated and non-carbonated beverages. Carbonated beverages include, but are not limited to, frozen carbonated beverages, enhanced sparkling beverages, cola, fruit-flavored sparkling beverages (e.g. lemon-lime, orange, grape, strawberry and pineapple), ginger-ale, soft drinks and root beer. Non-carbonated beverages include, but are not limited to, fruit juice, fruit-flavored juice, juice drinks, nectars, vegetable juice, vegetable-flavored juice, sports drinks, energy drinks, enhanced water drinks, enhanced water with vitamins, near water drinks (e.g., water with natural or synthetic flavorants), coconut water, tea type drinks (e.g. black tea, green tea, red tea, oolong tea), coffee, cocoa drink, beverage containing milk components (e.g. milk beverages, coffee containing milk components, café au lait, milk tea, fruit milk beverages), beverages containing cereal extracts and smoothies.

Beverage concentrates and beverage syrups are prepared with an initial volume of liquid matrix (e.g. water) and the desired beverage ingredients. Full strength beverages are then prepared by adding further volumes of water. Powdered beverages are prepared by dry-mixing all of the beverage ingredients in the absence of a liquid matrix. Full strength beverages are then prepared by adding the full volume of water.

Beverages comprise a matrix, i.e. the basic ingredient in which the ingredients—including the compositions of the present invention—are dissolved. In one embodiment, a beverage comprises water of beverage quality as the matrix, such as, for example deionized water, distilled water, reverse osmosis water, carbon-treated water, purified water, demineralized water and combinations thereof, can be used. Additional suitable matrices include, but are not limited to phosphoric acid, phosphate buffer, citric acid, citrate buffer and carbon-treated water.

The beverage or beverage product can further include at least one additional sweetener. Any of the sweeteners detailed herein can be used, including natural, non-natural, or synthetic sweeteners. In certain embodiments, the beverage or beverage product does not contain a carbohydrate sweetener.

It is contemplated that the pH of the consumable, such as, for example, a beverage, does not materially or adversely affect the taste of the sweetener. A non-limiting example of the pH range of the beverage may be from about 1.8 to about 10. A further example includes a pH range from about 2 to about 5. In a particular embodiment, the pH of beverage can be from about 2.5 to about 4.2. On of skill in the art will understand that the pH of the beverage can vary based on the type of beverage. Dairy beverages, for example, can have pHs greater than 4.2.

The titratable acidity of a beverage may, for example, range from about 0.01 to about 1.0% by weight of beverage.

In one embodiment, the sparkling beverage product has an acidity from about 0.01 to about 1.0% by weight of the beverage, such as, for example, from about 0.05% to about 0.25% by weight of beverage.

The carbonation of a sparkling beverage product has 0 to about 2% (w/w) of carbon dioxide or its equivalent, for example, from about 0.1 to about 1.0% (w/w).

The beverage can be caffeinated or non-caffeinated.

The temperature of a beverage may, for example, range from about 4° C. to about 100° C., such as, for example, from about 4° C. to about 25° C.

The beverage can be a full-calorie beverage that has up to about 120 calories per 8 oz. serving.

The beverage can be a mid-calorie beverage that has up to about 60 calories per 8 oz. serving.

The beverage can be a low-calorie beverage that has up to about 40 calories per 8 oz. serving.

The beverage can be a zero-calorie that has less than about 5 calories per 8 oz. serving.

In a particular embodiment, the consumable is a cola beverage. The cola beverage can be a low-, mid- or zero-calorie beverage.

In a particular embodiment, the beverage is a diet beverage. In a more particular embodiment, the beverage is a diet carbonated beverage.

In a particular embodiment, the beverage of the present invention is a flavored water beverage.

V. Methods of Use

Methods of enhancing the sweetness of a consumable and/or modulating one or more taste attributes of the sweetener to make the consumable taste more like a sucrose-sweetened consumable are provided.

In one embodiment, a method of enhancing the sweetness of a consumable comprises (i) providing a consumable comprising at least one sweetener and (ii) adding at least one dihydrochalcone compound of Formula I to the consumable to provide a consumable with enhanced sweetness.

In another embodiment, a method of enhancing the sweetness of a consumable comprises (i) providing a consumable matrix and (ii) adding at least one sweetener and at least one dihydrochalcone compound of Formula I to the consumable matrix to provide a consumable with enhanced sweetness. The at least one sweetener and at least one dihydrochalcone compound of Formula I can be added together, i.e. in the form of a composition, or separately.

As used herein, the term "consumable matrix" refers to a consumable containing all typical ingredients except the sweetener or sweetener component.

In a particular embodiment, the SE of the consumable comprising the at least one dihydrochalcone compound of Formula I and at least one sweetener is enhanced by at least about 1.2-fold compared to the SE of the consumable in the absence of the at least one dihydrochalcone compound of Formula I, such as, for example, at least about 1.3-fold, at least about 1.4-fold, at least about 1.5-fold, at least about 1.6-fold, at least about 1.7-fold, at least about 1.8-fold, at least about 1.9-fold and at least about 2.0-fold.

In another embodiment, addition of the at least one dihydrochalcone compound of Formula I to the consumable or consumable matrix increases the degrees Brix by at least 1 degree Brix compared to the Brix of the consumable without the dihydrochalcone compound of Formula I, such as, for example, at least 2 degrees Brix, at least 3 degrees Brix or at least 4 degrees Brix.

In a particular embodiment, the consumable is a beverage.

Accordingly, a method of enhancing the sweetness of a beverage comprises (i) providing a beverage comprising at least one sweetener and (ii) adding at least one dihydrochalcone compound of Formula I to the beverage to provide a beverage with enhanced sweetness.

In another embodiment, a method of enhancing the sweetness of a beverage comprises (i) providing a beverage matrix and (ii) adding at least one sweetener and at least one dihydrochalcone compound of Formula I to the beverage matrix to provide a beverage with enhanced sweetness. The at least one sweetener and at least one dihydrochalcone compound of Formula I can be added together, i.e. in the form of a composition, or separately.

In another aspect, a method of making a consumable taste more like a sucrose-sweetened consumable comprises (i) providing a consumable comprising at least one sweetener and (ii) adding at least one dihydrochalcone compound of Formula I in an amount effective to modulate one or more taste attributes of the sweetener to make the consumable taste more like a sucrose-sweetened consumable compared to the consumable in the absence of the at least one dihydrochalcone compound of Formula I.

In another embodiment, a method of making a consumable taste more like a sucrose-sweetened consumable comprises (i) providing a consumable matrix and (ii) adding at least one sweetener and at least one dihydrochalcone compound of Formula I to the consumable matrix to provide a consumable that tastes more like a sucrose-sweetened consumable, wherein the at least one dihydrochalcone compound of Formula I is present in an amount effective to modulate one or more taste attributes of the sweetener to make the consumable taste more like a sucrose-sweetened consumable compared to the consumable in the absence of the at least one dihydrochalcone compound of Formula I. The at least one sweetener and at least one dihydrochalcone compound of Formula I can be added together, i.e. in the form of a composition, or separately.

As discussed above, in the present methods the at least one dihydrochalcone compound of Formula I may be present in the consumable in the identified concentrations.

Methods or preparing consumables with enhanced sweetness are also provided.

In one aspect, a method of preparing a consumable comprises (i) providing a consumable comprising at least one sweetener and (ii) adding at least one dihydrochalcone compound of Formula I to the consumable to provide a consumable.

In another aspect, a method of preparing a consumable is provided, comprising (i) providing a consumable matrix and (ii) adding at least one sweetener and at least one dihydrochalcone compound of Formula I to the consumable matrix to provide a consumable. The at least one sweetener and at least one dihydrochalcone compound of Formula I can be added together, i.e. in the form of a composition, or separately.

In still another aspect, a method of preparing a consumable is provided, comprising (i) providing a consumable matrix and (ii) adding a composition comprising at least one sweetener and at least one dihydrochalcone compound of Formula I to the consumable matrix to provide a consumable.

In yet another aspect, a method of preparing a beverage is provided, comprising (i) providing a beverage matrix and (ii) adding at least one sweetener and at least one dihydrochalcone compound of Formula I to the beverage matrix to provide a beverage. The at least one sweetener and at least one dihydrochalcone compound of Formula I can be added together, i.e. in the form of a composition, or separately.

In a further aspect, a method of preparing a beverage is provided, comprising (i) providing a beverage matrix and (ii) adding a composition comprising at least one sweetener and at least one dihydrochalcone compound of Formula I to the beverage matrix to provide a beverage.

In a still further aspect, a method of preparing a sweetened beverage is provided, comprising (i) providing an unsweetened beverage and (ii) adding at least one sweetener and at least one dihydrochalcone compound of Formula I to the unsweetened beverage to provide a sweetened beverage. The at least one sweetener and at least one dihydrochalcone compound of Formula I can be added together, i.e. in the form of a composition, or separately.

In another aspect, a method of preparing a sweetened beverage is provided, comprising (i) providing an unsweetened beverage and (ii) adding a composition comprising at least one sweetener and at least one dihydrochalcone compound of Formula I to the unsweetened beverage to provide a sweetened beverage.

Example 1: Isolation and Characterization of Analogues from *B. harlandii*

Instrument: 1D and 2D NMR data were recorded on a Bruker Avance III 500 or 600 HD spectrometer, and the $^1$H and $^{13}$C NMR chemical shifts were referenced to the residual solvent peaks for methanol-$d_4$ ($\delta$H 3.31 and $\delta$c 49.0) and DMSO-$d_6$ ($\delta$H 2.50 and $\delta$c 39.52). High-resolution electrospray ionization mass spectrometry (HRESIMS) was performed in the negative ion mode with a Sciex Triple TOF 4600 spectrometer. GC-MS were performed on an Agilent 7890A/5977A GC/MSD System using an Agilent HP-5MS column (30 m×0.25 mm×0.25 µm). Semipreparative HPLC was carried out on an Agilent 1260 infinity with a UV detector using a Boston Green ODS-AQ column (10×250 mm, 5 µm). Preparative HPLC was carried out on an Shimadzu LC-20AP system using a YMC Actus Hydrosphere C18 column (30×250 mm, 5 µm) or YMC Triart ODS column (50×250 mm, 7 µm). Column chromatography (CC) was performed using AB-8 resin (Sunresin New Materials Co. Ltd., China), MCI gel CHP-20 (Mitsubishi Chemical Systems, Inc. Japan), and Sephadex LH-20 (GE Healthcare Bio-Sciences AB, Sweden). Lyophilization was carried out on a Scientz-18N freeze dryer (Ningbo Scientz Biotechnology Co., Ltd.). The information of Chemical reagents was as follows: 95% EtOH, MeOH, MeCN, n-BuOH, EtOAc, all in A.R. grade (Cinc High Purity Solvents (Shanghai) Co., Ltd.), hydrochloric acid, NaOH, pyridine, n-hexane all in A.R. grade (Sinopharm Chemical Reagent Co. Ltd.), acetonitrile for Semipreparative HPLC in HPLC grade (Merck KGaA), and L-cysteine methyl ester hydrochloride, L-trimethylsilylimidazole, D-gulcose Reference Standard and L-gulcose Reference Standard all in L.R. grade (Shanghai Macklin Biochemical Co., Ltd.).

Sourcing: The whole plant of *Balanophora harlandii* air-dried was collected from AnShun, GuiZhou. The presence of tentative hesperetin dihydrochalcone-4'-β-D-glucoside (HDCG) and six analogues was confirmed by LC-MS.

Extraction: The dried powder of *B. harlandii* (10 kg) was extracted with 80% ethanol (100 L) at 70° C. for 4 h. After evaporation of the ethanol, the solution was concentrated to a small volume (5 L).

LC-MS Guided Isolation

The concentrated solution was subjected to an AB-8 resin column and eluted with 10% ethanol (100 L) and 95% ethanol (60 L). The 95% ethanol eluates were applied to a MCI column and gradually eluted with MeOH/$H_2$O (1:4→4:1) to afford 5 fractions. EIC targeting the quasi-ions of HDCG and its possible analogues (e.g. [M-H]$^-$ at m/z of 465) were used to guide fractionation and isolation. Fraction 1 (70 g) was dissolved with water (3 L), adjusted pH to 1 with hydrochloric acid and partitioned with EtOAc (3 L). The water fraction (30 g) was adjusted pH to 7 with 1% NaOH solution and concentrated to 20 mL. The 20 mL sample was subjected to a Sephadex LH-20 column, followed by preparative HPLC (YMC Actus Hydrosphere $C_{18}$, 30×250 mm, 5 µm) with water-acetonitrile (74:26) at 30 mL/min to yield CC-00487 (180 mg).

Fraction 2 (60 g) was dissolved in water (3 L) and adjusted pH to 1 with hydrochloric acid, then extracted with EtOAc (3 L) twice. The EtOAc fractions were combined and concentrated to get semi-solid (20 g), which was dissolved in 50 mL methanol-water (1:1) and subjected to chromatography on a MCI column, a Sephadex LH-20 column, finally purified on preparative HPLC with water-acetonitrile (79:21) at 30 mL/min to obtain CC-00486 (12 mg).

Fraction 3 (20 g) was dissolved in 100 mL methanol-water (7:3) and chromatographied on a Sephadex LH-20 column, further purified on preparative HPLC with water-acetonitrile (78:22) at 60 mL/min to obtain CC-00549 (3 mg).

Fraction 4 (60 g) was dissolved with 4% NaOH and was adjusted pH to 10 with hydrochloric acid, subsequently extracted with n-Butanol (4 L). The water phase was adjusted pH to 5 and partitioned with n-Butanol (4 L) one more time. The second n-Butanol fraction (25 g) was chromatographed over Sephadex LH-20, eluting with 50% ethanol to yield two mixtures containing targeted masses. Mixture 1 was further purified on semi-preparative HPLC using Boston Green ODS-AQ (10×250 mm, 5 µm) with water-acetonitrile (74:26) at 3.5 mL/min to yield hesperetin dihydrochalcone-4'-β-D-glucoside (HDCG, 2.3 mg) and CC-00474 (250 mg). Mixture 2 was further purified on preparative HPLC with water-acetonitrile (72:28) at 60 mL/min to obtain compounds CC-00536 (34 mg) and CC-00537 (16 mg).

Determination of the Absolute Configuration of Glucose 2.4 mg of CC-00486 and 2.6 mg of CC-00487 was dissolved in 1M HCl water (5 mL), respectively. Each solution was heated at 100° C. to reflux for 1.5 h. The mixture was cooled to room temperature and extracted twice with EtOAc (5 mL/each time). The water layer was evaporated to dryness under reduced pressure to furnish a glucose residue. The residue/D-glucose/L-glucose was dissolved in pyridine (0.5 mL) respectively, to which 0.5 mL L-cysteine methyl ester hydrochloride was added. The mixture was kept at 60° C. for 2 h, dried under reduced pressure, and trimethylsilylated with 1-trimethylsilylimidazole (0.5 mL) for 2 h. The mixture was partitioned between n-hexane and water (1.0 mL each), and the hexane extract was analyzed by GC-MS under the following conditions: column temperature, 230° C.; injection temperature, 250° C.; carrier, He gas; split ratio, 10:1; flow rate, 0.8 mL/min; MS scan range, 50-500.

Results

HDCG was obtained as a white amorphous powder and had a molecular formula $C_{22}H_{26}O_{11}$ by HRESIMS analysis ([M-H]⁻ at m/z 465.1422, calcd 465.1412, Δ=2.1 ppm). A loss of one units of 162 Da at m/z 303.0873 observed from MS/MS as well as an anomeric proton (δ 4.85, d, J=7.7 Hz, H-1″) suggested one ft-glucose moiety in the structure. The ¹H NMR spectrum of its aglycone (Table 1) was similar to that of 3-hydroxyphloretin-4′-O-β-D-glucoside except for a methoxy group instead of a hydroxyl group, indicating the presence of a phloroglucinol ring [δ 6.12 (2H, s, H-3′ and H-5′)], a catechol ring [δ 6.65 (d, J=1.8 Hz, H-2), 6.79 (d, J=8.2 Hz, H-5) and 6.59 (dd, J=1.8, 8.2 Hz, H-6)].

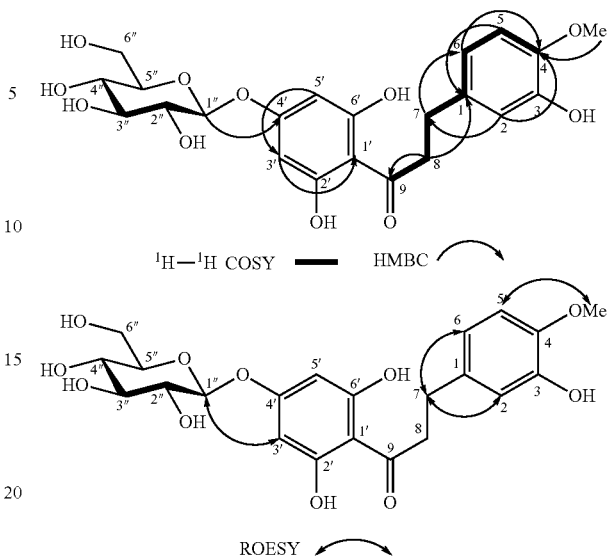

CC-00474 was obtained as a white amorphous powder and had the same molecular formula with HDCG by HRESIMS analysis ([M-H]⁻ at m/z 465.1408, calcd., 465.1402, Δ=1.3 ppm). Comprehensive comparative analysis of its ¹H-NMR and ¹³C-NMR spectra (Table 1) with HDCG indicated the only difference was the location of the methoxy and hydroxy group in the catechol ring. The methoxy group was connected to C-3 instead of C-4 by the cross peaks of OCH₃/H-2 in the ROESY experiment, which was further determined by the correlation networks of OCH₃/C-3, and H-5/C-3 in the HMBC experiments. Based on the above evidence, CC-00474 was identified as a new compound, named 3-methoxyphloretin-4′-O-β-D-glucoside. Key correlations of CC-00474 are shown below:

TABLE 1

NMR Spectroscopic Data of HDCG and CC-00474[a]

| Position | HDCG $\delta_H$ (multiplicity, J in Hz) | $\delta_C$ | CC-00474 $\delta_H$ (multiplicity, J in Hz) | $\delta_C$ |
|---|---|---|---|---|
| 1 | — | 134.3 | — | 132.2 |
| 2 | 6.65 (d, 1.8) | 115.9 | 6.80 (d, 1.8) | 112.6 |
| 3 | — | 146.4 | — | 147.4 |
| 4 | — | 146.0 | — | 144.6 |
| 5 | 6.79 (d, 8.2) | 112.5 | 6.66 (d, 8.0) | 115.3 |
| 6 | 6.59 (dd, 8.2, 1.8) | 118.9 | 6.61 (dd, 8.0, 1.8) | 120.3 |
| 7 | 2.74 (2H, t, 7.6) | 29.6 | 2.79 (2H, t, 7.6) | 29.8 |
| 8 | 3.26 (2H, t, 7.6) | 45.6 | 3.28 (2H, t, 7.6) | 45.7 |
| 9 | — | 205.1 | — | 205.1 |
| 1′ | — | 105.6 | — | 105.4 |
| 2′ | — | 164.4 | — | 163.7 |
| 3′ | 6.00 (s) | 95.0 | 6.04 (s) | 95.0 |
| 4′ | — | 163.5 | — | 163.4 |
| 5′ | 6.00 (s) | 95.0 | 6.04 (s) | 95.0 |
| 6′ | — | 164.4 | — | 163.7 |
| 1″ | 4.85 (d, 7.7) | 99.6 | 4.87 (d, 7.7) | 99.5 |
| 2″ | 3.19 (m) | 73.2 | 3.20 (m) | 73.0 |
| 3″ | 3.26 (m) | 76.6 | 3.26 (m) | 76.4 |
| 4″ | 3.16 (m) | 69.6 | 3.16 (m) | 69.4 |
| 5″ | 3.29 (m) | 77.2 | 3.30 (m) | 77.1 |
| 6″ | 3.46 (m), 3.65 (m) | 60.6 | 3.48 (m), 3.67 (m) | 60.5 |
| —OCH₃ | 3.70 (s) | 55.9 | 3.73 (s) | 55.5 |

[a]NMR data were recorded on Broker Avance 600 in DMSO-d₆, H: 600 MHz, ¹³C: 150 MHz Two methylene groups were mutually coupled in ¹H-¹H COSY experiment [δ 3.26 (2H, t, J=7.6 Hz, H-8) and 2.74 (2H, t, J=7.6 Hz, H-7)]. The key ROESY correlations of OCH₃/H-5 fixed the methoxy group at C-4, which was further determined by the correlation networks of OCH₃/C-4, H-2/C-4 and H-6/C-4 in the HMBC experiment. Similarly, the glucosyl unit was connected to C-4′ by the correlations of H-1″/C-4′. Taken together, HDCG was identified as the known hesperetin dihydrochalcone-4′-O-β-D-glucoside. Key correlations of HDCG are shown below:

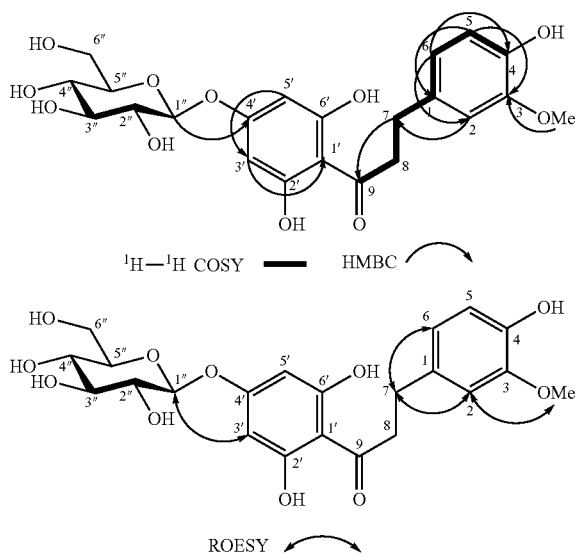

¹H—¹H COSY ▬▬   HMBC ⌒▶

ROESY ⌒▶

CC-00486 was obtained as a white amorphous powder and had the same molecular formula by HRESIMS analysis ([M-H]⁻ at m/z 465.1414, calcd., 465.1402, Δ=2.6 ppm). The ¹H NMR spectrum (Table 2) of the compound was similar to that of 3-hydroxyphloretin-2'-O-β-D-glucoside except for a methoxy group instead of a hydroxyl group, indicating the presence of a phloroglucinol ring [δ 6.15 (1H, d, J=1.7 Hz, H-3') and 5.92 (1H, d, J=1.7 Hz, H-5')], a catechol ring [δ 6.80 (d, J=1.2 Hz, H-2), 6.65 (d, J=8.0 Hz, H-5) and 6.62 (dd, J=1.3, 8.0 Hz, H-6)].

Two methylene groups were mutually coupled in ¹H-¹H COSY experiment [δ 3.43 (1H, m, H-8), 3.34 (1H, m, H-8) and 2.80 (2H, t, J=8.0 Hz, H-7)]. The key ROESY correlations of OCH₃/H-2 fixed the methoxy group at C-3, which was further determined by the correlation networks of OCH₃/C-3, H-2/C-4 and H-5/C-3 in the HMBC experiment. Similarly, the glucosyl unit was connected to C-2' by the correlations of H-1"/H-3' in the ROESY and H-1"/C-2' in the HMBC experiment. The absolute configuration of glucose moiety was determined to be D-configured using the method described above. Based on the above evidence, CC-00486 was identified as a new compound 3-methoxyphloretin-2'-O-β-D-glucoside. Key correlations of CC-00486 are shown below:

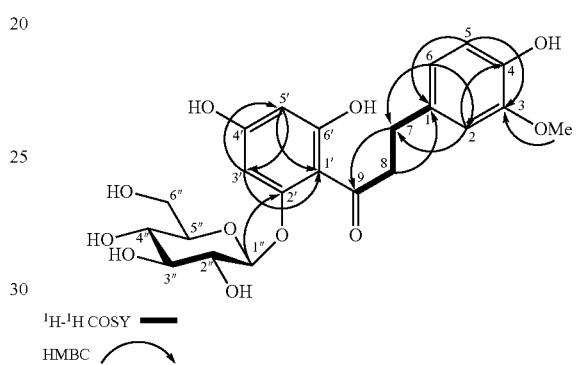

¹H-¹H COSY ▬▬

HMBC ⌒▶

TABLE 2

NMR Spectroscopic Data of CC-00486 and CC-00487[a]

| | CC-00486 | | CC-00487 | |
| --- | --- | --- | --- | --- |
| Position | $δ_H$ (multiplicity, J in Hz) | $δ_C$ | $δ_H$ (multiplicity, J in Hz) | $δ_C$ |
| 1 | — | 132.2 | — | 132.0 |
| 2 | 6.80 (d, 1.2) | 112.3 | 6.79 (d. 1.6) | 112.3 |
| 3 | — | 147.4 | — | 147.4 |
| 4 | — | 144.5 | — | 144.5 |
| 5 | 6.65 (d, 8.0) | 115.2 | 6.65 (d, 8.0) | 115.2 |
| 6 | 6.62 (dd, 8.0, 1.3) | 120.4 | 6.62 (dd, 8.0, 1.7) | 120.3 |
| 7 | 2.80 (t, 8.0) | 29.6 | 2.81 (t, 7.5) | 29.3 |
| 8 | 3.43, 3.34 (m) | 44.8 | 3.45, 3.32 (m) | 45.2 |
| 9 | — | 204.5 | — | 205.2 |
| 1' | — | 104.8 | — | 107.1 |
| 2' | — | 160.8 | — | 159.8 |
| 3' | 6.15 (d, 1.7) | 94.5 | 6.35 (d, 2.3) | 94.3 |
| 4' | — | 165.5 | — | 162.7 |
| 5' | 5.92 (d, 1.7) | 96.9 | 6.16 (d, 2.3) | 97.5 |
| 6' | — | 165.5 | — | 163.8 |
| 1" | 4.93 (d, 7.1) | 100.8 | 5.01 (d, 7.4) | 100.5 |
| 2" | 3.29 (m) | 73.3 | 3.29 (m) | 73.3 |
| 3" | 3.33 (m) | 76.7 | 3.30 (m) | 76.6 |
| 4" | 3.19 (m) | 69.4 | 3.27 (m) | 69.8 |
| 5" | 3.33 (m) | 77.2 | 3.44 (m) | 77.2 |
| 6" | 3.69, 3.50 (m) | 60.5 | 3.70, 3.44 (m) | 60.8 |
| 1''' | — | — | 4.96 (d, 7.4) | 99.3 |
| 2''' | — | — | 3.24 (m) | 73.0 |
| 3''' | — | — | 3.26 (m) | 76.5 |
| 4''' | — | — | 3.45 (m) | 69.7 |
| 5''' | — | — | 3.11 (m) | 77.0 |
| 6''' | — | — | 3.70, 3.44 (m) | 60.7 |
| —OCH₃ | 3.74 (s) | 55.6 | 3.74 (s) | 55.5 |

[a] NMR data were recorded on Broker Avance 600 in DMSO-d₆, ¹H: 600 MHz, ¹³C: 150 MHz

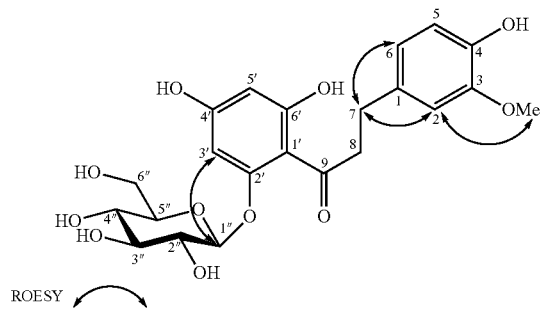
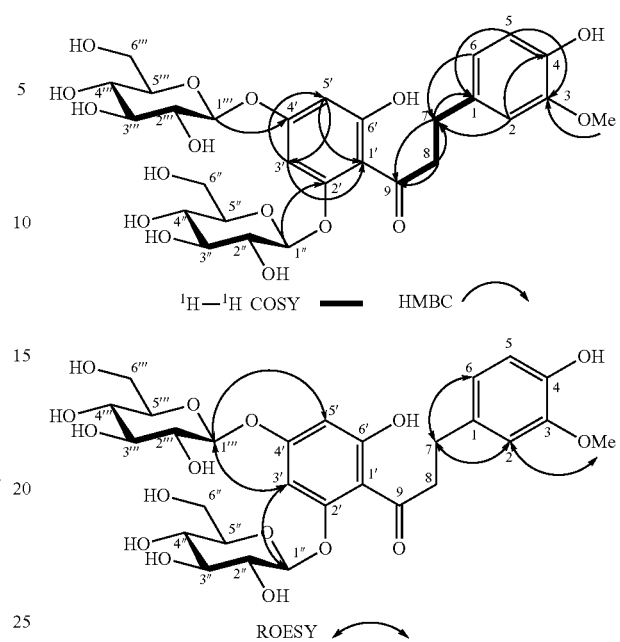

CC-00487 was obtained as a white amorphous powder. Its HRESIMS exhibited a quasi-molecular ion peak at m/z 627.1931 [M-H]⁻, calcd. 627.1931, Δ=0.1 ppm, which was compatible with the molecular formula $C_{28}H_{36}O_{16}$. The $^1$H NMR spectrum (Table 2) showed two groups signals of sugar moiety and the coupling constants of the sugar moiety protons [(δ 5.01, d, J=7.4 Hz, H-1″) and (δ 4.96, d, J=7.4 Hz, H-1‴)] suggested the presence of two β-linked glucose. In addition, The 41 NMR spectrum of non-sugar moiety was similar to that of CC-00486, indicating the presence of a phloroglucinol ring [δ 6.35, d, J=2.3 Hz, H-3' and δ 6.16, d, J=2.3 Hz, H-5')], a catechol ring [δ 6.79 (d, J=1.6 Hz, H-2), 6.65 (d, J=8.0 Hz, H-5) and 6.62 (dd, J=1.7, 8.0 Hz, H-6)]. Two methylene groups were mutually coupled in $^1$H-$^1$H COSY experiment [δ 3.45 (1H, m, H-8), 3.32 (1H, m, H-8) and 2.81 (2H, t, J=7.5 Hz, H-7)]. The key ROESY correlations of OCH₃/H-2 fixed the methoxy group at C-3, which was further determined by the correlation networks of OCH₃/C-3, H-2/C-4 and H-5/C-3 in the HMBC experiment. Similarly, one glucosyl unit was linked to C-4' by the correlations of H-1‴/C-4', the other one was linked to C-2' by the correlations of H-1″/C-2' in the HMBC experiment. The absolute configuration of glucose moiety was determined to be D-configured using methods listed above. Based on the above evidence, CC-00487 was identified as a new compound 3-methoxyphloretin-2',4'-O-β-D-glucoside. Key correlations are shown below:

CC-00549 was obtained as a brown amorphous powder, the molecular formula $C_{23}H_{26}O_{13}$ was deduced from the negative-ion mode HRESIMS (m/z 509.1314 [M-H]⁻, calcd. 509.1301, Δ=2.6 ppm). The $^1$H-NMR data (Table 3) exhibit the signals for one set of ABX-type aromatic H-atoms at δ 6.70 (1H, d, overlapped, H-2), 6.71 (1H, d, J=8.0 Hz, H-5) and 6.56 (1H, dd, J=8.0, 1.5 Hz, H-6), one singlet at higher field of the aromatic region δ 6.30 (1H, s, H-5'), together with two mutually coupled methylene signals δ 3.34 (2H, m, H-8) and 2.80 (2H, t, J=8.0 Hz, H-7). The data suggested the presence of a dihydrochalcone skeleton with a pentasubstituted B-ring in the molecule. In addition, one glucopyranosyl unit (anomeric H- and C-atom signals at δ 4.94 (1H, d, overlapped, H-1″) and δ 101.4 (C-1″), resp.) was evidenced by $^1$H— and $^{13}$C-NMR data of CC-00549.

Table 3 NMR Spectroscopic Data of CC-00549, CC-00536, and CC-00537ᵃ

| Position | CC-00549 δ_H (multiplicity, J in Hz) | δ_C | CC-00536 δ_H (multiplicity, J in Hz) | δ_C | CC-00537 δ_H (multiplicity, J in Hz) | δ_C |
|---|---|---|---|---|---|---|
| 1 | — | 134.7 | — | 134.7 | — | 134.7 |
| 2 | 6.70 (d, overlapped) | 116.6 | 6.70 (d, 2.5) | 116.3 | 6.68 (d, overlapped) | 116.3 |
| 3 | — | 145.7 | — | 146.0 | — | 146.1 |
| 4 | — | 143.9 | — | 144.3 | — | 144.3 |
| 5 | 6.71 (d, 8.0) | 116.7 | 6.67 (d, 8.2) | 116.6 | 6.67 (d, 8.0) | 116.6 |
| 6 | 6.56 (dd, 8.0, 1.5) | 120.9 | 6.54 (dd, 8.0, 2.0) | 120.7 | 6.54 (dd, 8.0, 1.7) | 120.7 |
| 7 | 2.80 (t, 8.4) | 31.3 | 2.80 (t, 6.5) | 31.3 | 2.80 (t, 6.5) | 31.4 |
| 8 | 3.34 (m) | 47.3 | 3.29 (m) | 47.4 | 3.31 (t, overlapped) | 47.4 |
| 9 | — | 207.7 | — | 207.1 | — | 207.1 |
| 1' | — | 106.7 | — | 107.1 | — | 107.0 |
| 2' | — | 164.3 | — | 165.4 | — | 165.4 |
| 3' | — | 104.3 | 6.08 (s) | 96.4 | 6.13 (s) | 96.5 |
| 4' | — | 162.6 | — | 164.8 | — | 164.9 |
| 5' | 6.30 (s) | 94.8 | 6.08 (s) | 96.4 | 6.13 (s) | 96.5 |
| 6' | — | 162.6 | — | 165.4 | — | 165.4 |
| 7' | 3.60 (br s) | 29.4 | — | — | — | — |
| 8' | — | 177.5 | — | — | — | — |
| 1″ | 4.94 (d, overlapped) | 101.4 | 4.99 (d, 7.4) | 101.1 | 5.06 (d, 7.5) | 101.0 |
| 2″ | 3.52 (m) | 74.3 | 3.48 (dd, 15.8, 8.1) | 74.6 | 3.59 (m) | 74.9 |
| 3″ | 3.52 (m) | 77.5 | 3.53 (dd, 16.3, 8.5) | 77.7 | 3.80 (m) | 76.4 |

Table 3 NMR Spectroscopic Data of CC-00549, CC-00536, and CC-00537[a]

| | CC-00549 | | CC-00536 | | CC-00537 | |
|---|---|---|---|---|---|---|
| Position | $\delta_H$ (multiplicity, J in Hz) | $\delta_C$ | $\delta_H$ (multiplicity, J in Hz) | $\delta_C$ | $\delta_H$ (multiplicity, J in Hz) | $\delta_C$ |
| 4" | 3.42 (m) | 70.9 | 3.53 (dd, 16.3, 8.5) | 71.2 | 5.04 (m) | 72.1 |
| 5" | 3.52 (m) | 77.9 | 3.74 (m) | 75.7 | 3.80 (m) | 75.7 |
| 6" | 3.93 (dd, 12.2, 1.8) | 62.2 | 4.55 (dd, 12.0, 2.0) | 64.3 | 3.70 (d, 12.2) | 62.1 |
|  | 3.73 (m) |  | 4.45 (dd, 12.0, 5.0) |  | 3.59 (m) |  |
| 1'" | — | — | — | 121.2 | — | 121.0 |
| 2'" | — | — | 7.09 (s) | 110.3 | 7.12 (s) | 110.4 |
| 3'" | — | — | — | 146.5 | — | 146.5 |
| 4'" | — | — | — | 139.6 | — | 140.1 |
| 5'" | — | — | — | 146.5 | — | 146.5 |
| 6'" | — | — | 7.09 (s) | 110.3 | 7.12 (s) | 110.4 |
| 7'" | — | — | — | 168.3 | — | 167.7 |

[a]NMR data were recorded on Bruker Avance III 500 in menthanol-$d_4$, $^1$H: 500 MHz, $^{13}$C: 125 MHz The HMBC correlation of glucosyl H-1"/C-4' and the ROESY correlation between glucosyl H-1" and H-5' confirmed the location of the glucopyranosyl group at C-4'. In addition, the methylene C-7' was connected to C-3' by long-range correlations of H-7'/C-2', C-3', C-4' and carboxy C-8' in the HMBC experiment. Key correlations are shown below:

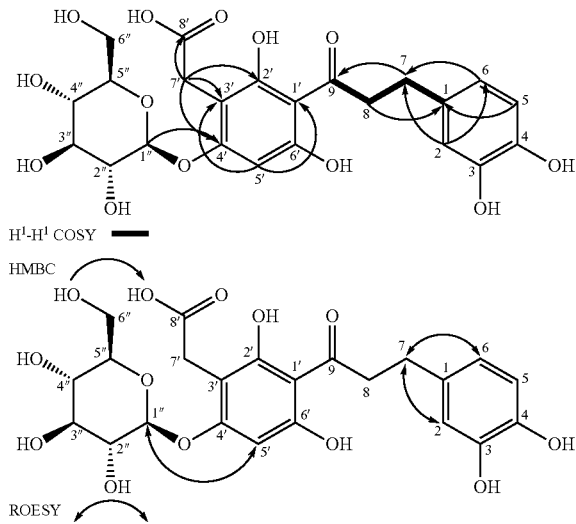

CC-00536 was obtained as a pale yellow amorphous powder, the molecular formula $C_{28}H_{28}O_5$ assigned by the peak at m/z 603.1354 ([M-H]$^-$ calcd. 603.1355, Δ=−0.2 ppm) in the negative-ion HRESIMS. $^1$H-NMR (500 MHz, methanol-$d_4$) and $^{13}$C-NMR (125 MHz, methanol-$d_4$, Table 3) allowed CC-00536 to be identified as a known 3-hydroxyphloretin 4'-O-[6"-O-galloyl]-β-D-glucopyranoside.

CC-00537 was obtained as a pale green amorphous powder. It had the same molecular formula as CC-00536 by HRESIMS analysis (m/z 603.1377 ([M-H]$^-$ calcd. 603.1355, Δ=3.6 ppm). CC-00537 (Table 3) and CC-00536 had the same skeleton due to their close similarity in NMR data except for difference in the glucosyl unit. Location of the galloyl group in CC-00537 was determined to be at glucose C-4"rather than C-6" on the basis of lower field shift of H-4"[δ 5.04 (m)] and higher field shifts of H-6'[δ 3.70 (d, J=12.2 Hz), 3.59 (m)] compared to that of CC-00536. This was also supported by long-range correlation of H-4" and carbonyl in galloyl unit (δ 167.7, C-7'") in the HMBC experiment. Accordingly, CC-00537 was deduced as a new compound 3-Hydroxyphloretin 4'-O-[4"-O-galloyl]-β-D-glucopyranoside. Key correlations are shown below:

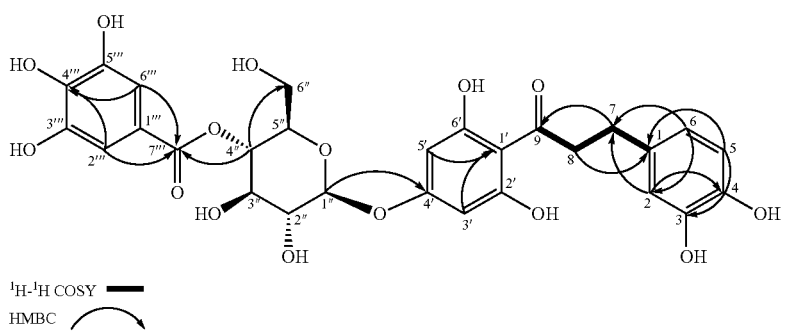

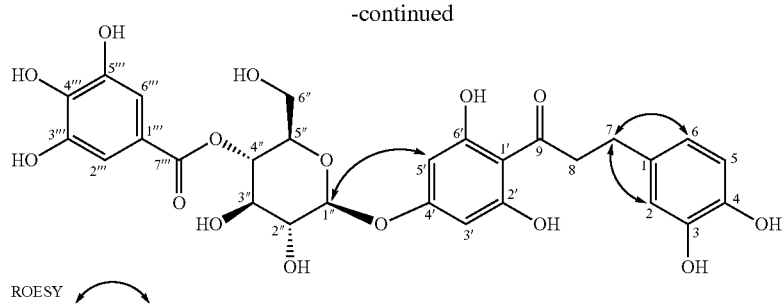

ROESY

Example 2: Sweetness Enhancement

Samples were prepared with the following ingredients:

TABLE 1

2% of CC-00474 in PG

| Ingredient | Amount |
| --- | --- |
| CC-00474 | 2 mg |
| Propylene glycol | 98 mg |

TABLE 2

250 ppm of Rebaudioside M in acidic water

| Ingredient | Amount |
| --- | --- |
| Rebaudioside M | 125 mg |
| Water | 499.75 g |
| Citric acid | 125 mg |

TABLE 3

20 ppm of CC-00474 and 250 ppm of Rebaudioside M in acidic water

| Ingredient | Amount |
| --- | --- |
| 250 ppm of Rebaudioside M in acidic water (Table 2) | 100 g |
| CC-00474 in PG (Table 1) | 0.1 g |

TABLE 4

250 ppm of Rebaudioside M and PG in acidic water (Control)

| Ingredient | Amount |
| --- | --- |
| 250 ppm of Rebaudioside M in acidic water (Table 2) | 100 g |
| PG | 98 mg |

CC-00474 in PG was prepared in weighing boat and added to Reb M solution while stirring. The weighing boat was rinsed with Reb M solution. The solution was stirred visibly clear and the sample was poured into a glass bottle and stored at 4° C.

Bottles were removed from the refrigerator and about 25 ml of beverage was poured into 4 oz-plastic cups. Panelists were given mineral water to rinse their mouth before tasting and between tasting different samples. Unsalted crackers were also given to panelist to eat followed by rinsing their mouth with mineral water before tasting the next sample.

A sample of Rebaudioside M in acidic water and a sample of CC-00474 and Rebaudioside M in acidic water were given to panelists. Panelists were asked to evaluate the sweetness of samples and describe the difference of taste profile. Panelists were instructed to sip, evaluate the sweetness, and then spit the samples in cups provided for that purpose.

All panelists agreed that the sample containing CC-00474 and Rebaudioside M was found to be sweeter than the sample containing Rebaudioside M only.

The invention claimed is:

1. A beverage comprising rebaudioside M and at least one dihydrochalcone compound of Formula I:

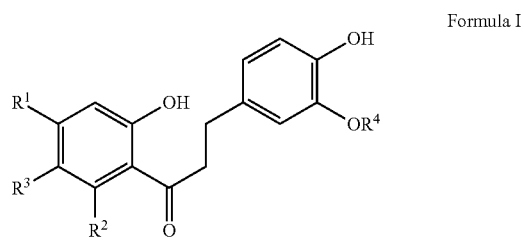

Formula I wherein $R^1$ is $OR^6$;

$R^6$ is a saccharide substituted by one or more oxygens in the hydroxyl positions by galloyl, vanillyl, feruloyl, a monohydroxybenzoyl, dihydroxybenzoyl, trihydroxybenzoyl, or methoxybenzoyl;

$R^2$ is independently selected from OH and is $OR^6$;

$R^3$ is selected from hydrogen and $CH_2COOH$; $R^4$ is selected from hydrogen and $CH_3$; and wherein the rebaudioside M is present in a sweetening amount.

2. The beverage of claim 1, wherein the at least one dihydrochalcone compound of Formula I is selected from the group consisting of compounds of Formula Ia:

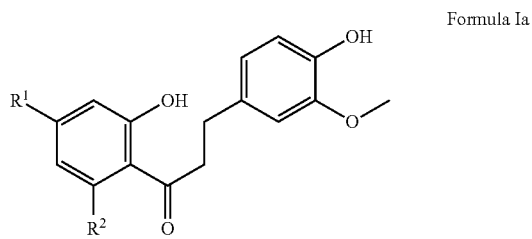

Formula Ia and combinations thereof.

3. The beverage of claim 1, wherein the beverage has up to about 40 calories per 8 ounce serving.

4. The beverage of claim 1, wherein the beverage is selected from the group consisting of a frozen carbonated beverage, enhanced sparkling beverage, cola, fruit-flavored sparkling beverage, ginger-ale, soft drink, root beer, fruit juice, fruit-flavored juice, juice drink, nectar, vegetable juice, vegetable-flavored juice, sports drink, energy drink, enhanced water drink, enhanced water with vitamins, near water drink, coconut water, black tea, green tea, red tea, oolong tea, coffee, cocoa drink, beverage containing milk components, beverage containing cereal extracts and a smoothie.

5. The beverage of claim 3, wherein the beverage is a fruit-flavored sparkling beverage.

6. The beverage of claim 4, wherein the beverage is an enhanced water drink.

7. The beverage of claim 1, wherein the beverage further comprises natural cola flavor, a colorant comprising caramel, an acidulant and caffeine.

8. The beverage of claim 1, wherein the at least one dihydrochalcone compound of Formula I is selected from the group consisting of compounds of Formula Ib:

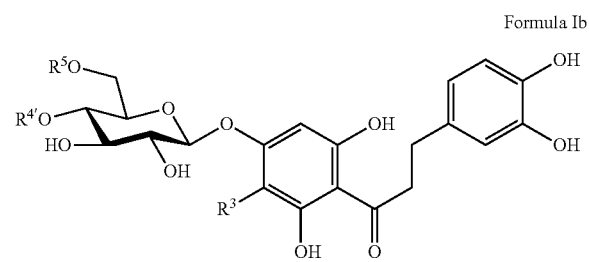

Formula Ib and combinations thereof; wherein $R^{4'}$ is galloyl and $R^5$ is H.

9. The beverage of claim 1, the at least one dihydrochalcone compound of Formula I is 3-hydroxyphloretin-4'-O-[6''-O-galloyl]-β-D-glucoside.

10. The beverage of claim 1, the at least one dihydrochalcone compound of Formula I is 3-hydroxyphloretin-4'-O-[4''-O-galloyl]-β-D-glucoside.

11. The beverage of claim 1, wherein the at least one dihydrochalcone compound of Formula I is present in the beverage in a concentration from about 1 ppm to about 50 ppm.

12. The beverage of claim 1, wherein the rebaudioside M is present in the beverage in a concentration from about 50 ppm to about 600 ppm.

13. The beverage of claim 1, wherein the beverage has less than about 5 calories per 8 ounce serving.

14. The beverage of claim 13, wherein the beverage is a fruit-flavored sparkling beverage.

15. The beverage of claim 1, wherein the at least one dihydrochalcone compound of Formula I is selected from the group consisting of compounds of Formula Ib:

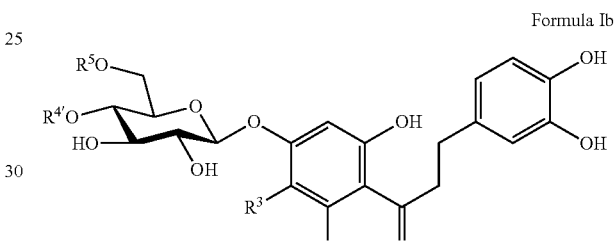

Formula Ib and combinations thereof, wherein $R^{4'}$ is H and $R^5$ is galloyl.

* * * * *